(12) United States Patent
Kiaei et al.

(10) Patent No.: US 9,614,778 B2
(45) Date of Patent: Apr. 4, 2017

(54) SYSTEMS AND METHODS FOR PACKET SCHEDULING IN A PHOTONIC SWITCHING SYSTEM

(71) Applicants: Mohammad Kiaei, Ottawa (CA); Hamid Mehrvar, Ottawa (CA)

(72) Inventors: Mohammad Kiaei, Ottawa (CA); Hamid Mehrvar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 67 days.

(21) Appl. No.: 14/799,726

(22) Filed: Jul. 15, 2015

(65) Prior Publication Data

US 2016/0226787 A1 Aug. 4, 2016

Related U.S. Application Data

(60) Provisional application No. 62/109,233, filed on Jan. 29, 2015.

(51) Int. Cl.
*H04J 14/00* (2006.01)
*H04L 12/863* (2013.01)
(Continued)

(52) U.S. Cl.
CPC .......... *H04L 47/6255* (2013.01); *H04L 47/56* (2013.01); *H04L 47/6275* (2013.01);
(Continued)

(58) Field of Classification Search
CPC ....... H04Q 11/0005; H04Q 2011/0024; H04Q 2011/0064; H04J 14/0284; H04L 49/357
(Continued)

(56) References Cited

U.S. PATENT DOCUMENTS 5,539,559 A * 7/1996 Cisneros ............. H04L 12/5601
370/414
7,215,666 B1 * 5/2007 Beshai ............... H04Q 11/0066
370/380
(Continued)

FOREIGN PATENT DOCUMENTS

WO WO2014180292 A2 11/2014
WO WO2014180311 A1 11/2014
(Continued)

OTHER PUBLICATIONS

PCT International Search Report and Written Opinion of PCT International Application No. PGT/CN2016/070061, Apr. 1, 2016, 11 pages.
(Continued)

*Primary Examiner* — Don N Vo

(57) ABSTRACT

Systems and methods for scheduling data for transmission over photonic switches are described herein. In one embodiment, an apparatus is provided that includes a node having M photonic interfaces. The node is configured to transmit a message having R requests. Each one of the R requests is a request to transmit data from the node to another node. R may be greater than M. Additionally or alternatively, each request may include a queue index corresponding to a respective queue in the node. The value of the queue index may be based on both a queue occupancy of the respective queue and a delay parameter.

23 Claims, 14 Drawing Sheets

(51) Int. Cl.
  *H04Q 11/00* (2006.01)
  *H04L 12/933* (2013.01)
  *H04L 12/875* (2013.01)
  *H04L 12/865* (2013.01)

(52) U.S. Cl.
  CPC ......... *H04L 49/10* (2013.01); *H04Q 11/0005* (2013.01); *H04Q 2011/005* (2013.01)

(58) Field of Classification Search
  USPC .......................................................... 398/45
  See application file for complete search history.

(56) References Cited

U.S. PATENT DOCUMENTS

2003/0043430 A1   3/2003   Handelman
2014/0334821 A1*  11/2014  Mehrvar ............ H04Q 11/0005
                                              398/54

FOREIGN PATENT DOCUMENTS

WO   WO2014183126 A1   11/2014
WO   WO2014183127 A2   11/2014

OTHER PUBLICATIONS

McKeown, N.; Mekkittikul, A.; Anantharam, V.; Walrand, J., "Achieving 100% throughput in an input-queued switch," IEEE Transactions on Communications, Aug. 1999, pp. 1260-1267, vol. 47, No. 8.

Javidi, T.; Magill, R.; Hrabik, T., "A high-throughput scheduling algorithm for a buffered crossbar switch fabric," IEEE International Conference on Communications, 2001, pp. 1586-1591, vol. 5, No. 5.

Yang, Xiaoling; Mehrvar, Hamid; Ma, Huixiao; Wang, Yan; Liu, Lulu; Fu, H.Y.; Geng, Dongyu; Goodwill, Dominic J.; and Bernier, Eric, "40Gb/s Pure Photonic Packet Switch for Data Centers" Optical Fiber Communication Conference Mar. 22-26, 2015, Los Angeles, California United States.

* cited by examiner

252 →

| Grant Order (Priority) | Index | Request | Granted? |
|---|---|---|---|
| 1 (first-highest priority request) | 92 | Node 1 → Node 3 | ✓ |
| 2 (second-highest priority request) | 77 | Node 1 → Node 4 | ✓ |
| 3 (third-highest priority request) | 73 | Node 2 → Node 1 | ✓ |
| 4 (fourth-highest priority request) | 69 | Node 2 → Node 4 | x |
| 5 (fifth-highest priority request) | 67 | Node 2 → Node 3 | ✓ |
| 6 (sixth-highest priority request) | 55 | Node 3 → Node 2 | ✓ |
| 7 (seventh-highest priority request) | 51 | Node 3 → Node 4 | x |
| 8 (eight-highest priority request) | 49 | Node 3 → Node 1 | ✓ |
| 9 (ninth-highest priority request) | 21 | Node 4 → Node 2 | ✓ |
| 10 (tenth-highest priority request) | 17 | Node 4 → Node 1 | x |
| 11 (eleventh-highest priority request) | 15 | Node 4 → Node 3 | x |
| 12 (twelfth-highest priority request) | 12 | Node 1 → Node 2 | x |

256

254 →

| Node | Output Interface | Transmit To | Input Interface | Receive From |
|---|---|---|---|---|
| 1 | $O_{11}$ | Node 3 | $I_{11}$ | Node 2 |
| | $O_{12}$ | Node 4 | $I_{12}$ | Node 3 |
| 2 | $O_{21}$ | Node 1 | $I_{21}$ | Node 3 |
| | $O_{22}$ | Node 3 | $I_{22}$ | Node 4 |
| 3 | $O_{31}$ | Node 2 | $I_{31}$ | Node 1 |
| | $O_{32}$ | Node 1 | $I_{32}$ | Node 2 |
| 4 | $O_{41}$ | ▓▓▓ | $I_{41}$ | ▓▓▓ —258 |
| | $O_{42}$ | Node 2 | $I_{42}$ | Node 1 |

SYSTEMS AND METHODS FOR PACKET SCHEDULING IN A PHOTONIC SWITCHING SYSTEM

PRIORITY CLAIM

This application claims priority to U.S. Provisional Patent Application Ser. No. 62/109,233, filed on Jan. 29, 2015, which is incorporated herein by reference.

FIELD

The application relates to scheduling data for transmission in a photonic switching system.

BACKGROUND

When data packets are transmitted through a network, they often have to travel through switches. For example, a data center may have several servers coupled to each other through one or more switches. A data packet at a first server may need to be transmitted to a second server via the switches.

Traditionally, electronic switches have been used to perform the switching.

However, photonic switches are now replacing electronic switches in some applications.

The way data is scheduled for transmission in electronic switching systems may not translate well to an architecture that uses photonic switches. Therefore, a method and apparatus for scheduling data transmissions in photonic switching systems is desired.

SUMMARY

Systems and methods for scheduling data for transmission over photonic switches are described herein.

In one embodiment, an apparatus is provided for use in a photonic switching system. The apparatus may have M photonic interfaces configured to transmit photonic signals from the apparatus to at least one photonic switching fabric. The apparatus may be configured to transmit a message having R requests. Each one of the requests may be to transmit data from the apparatus to a node that is coupled to the apparatus through the at least one photonic switching fabric. R may be greater than M. Additionally or alternatively, each one of the R requests may include a queue index corresponding to a respective queue in the apparatus. The value of the queue index may be based on both a queue occupancy of the respective queue and a delay parameter.

In another embodiment, a method is provided that includes an apparatus transmitting a message having R requests. Each one of the R requests may be a request to transmit data from the apparatus to a node that is coupled to the apparatus through at least one photonic switching fabric. The apparatus may have M photonic interfaces configured to transmit photonic signals from the apparatus to the at least one photonic switching fabric. R may be greater than M. Additionally or alternatively, each one of the R requests may include a queue index corresponding to a respective queue in the apparatus. The value of the queue index may be based on both a queue occupancy of the respective queue and a delay parameter.

In another embodiment, an apparatus is provided that may include K nodes and a photonic interface unit that optically couples the K nodes to a plurality of photonic switching fabrics. Each of the K nodes may have M photonic interfaces coupled to the plurality of photonic switching fabrics. Each of the K nodes may be configured to transmit a message comprising R requests. Each one of the R requests may be to transmit data to another node different from the K nodes. R may be greater than M.

In another embodiment, there is provided a scheduler for a photonic switching system. The scheduler may be configured to receive a message originating from a node in the photonic switching system. The node may have M photonic interfaces, and the message may comprise R requests. Each one of the R requests may be to transmit data from the node to another node. R may be greater than M. The scheduler may be further configured to prioritize each of the R requests in relation to other requests from other nodes. The scheduler may be further configured to determine whether at least one of the R requests is to be granted. The scheduler may be further configured to transmit a grant message to the node. The grant message may include an indication of which of the R requests have been granted.

In another embodiment, there is provided a method performed by a scheduler. The method may include receiving a message originating from a node in the photonic switching system. The node may have M photonic interfaces, and the message may comprise R requests. Each one of the R requests may be to transmit data from the node to another node. R may be greater than M. The method may further include prioritizing each of the R requests in relation to other requests from other nodes. The method may further include determining whether at least one of the R requests is to be granted. The method may further include transmitting a grant message to the node. The grant message may include an indication of which of the R requests have been granted.

Other aspects and features will become apparent to those of ordinarily skill in the art upon review of the following description.

BRIEF DESCRIPTION OF THE DRAWINGS

Embodiments will now be described with reference to the accompanying figures wherein:

FIG. 7 illustrates tables showing the grant order, whether each request is granted or not, and the configuration of each of the 10 photonic interfaces in another example;

DETAILED DESCRIPTION

For illustrative purposes, specific example embodiments will now be explained in greater detail below in conjunction with the figures.

Photonic switches are replacing electronic switches in some applications. Photonic switches may have advantages over electronic switches, such as scalability from hundreds of terabits to many petabits, lower cost, lower footprint, and lower power consumption. However, photonic switches may have fewer input/output ports compared to electronic switches, and lack a buffer. The use of photonic switches instead of electronic switches therefore typically requires a change in architecture. For example, rather than using one or more electronic switches, a switching system may instead use a stack of small space Silicon-Photonic (SiP) switches with no buffer and no arrayed waveguide grating (AWG). The stacking of the photonic switches may allow for scalability. However, such switches are still buffer-less, and the photonic switching should be lossless, and so traffic data buffering is performed in the electronic domain in aggregation nodes, such as Top-of-Racks (TORs), before sending the data to the photonic switches.

The use of these aggregation nodes in combination with the SiP switches has the potential to result in end-to-end transmission delay that, if not controlled, could be worse than that of an electronic switching system. The end-to-end transmission delays often of interest include the maximum delay through the switching system and the average delay through the switching system.

The end-to-end transmission delay through a photonic switching system will be affected by delays in the electrical-optical interfaces, the switching fabric, and the particular packet scheduling method employed.

Figure 1:
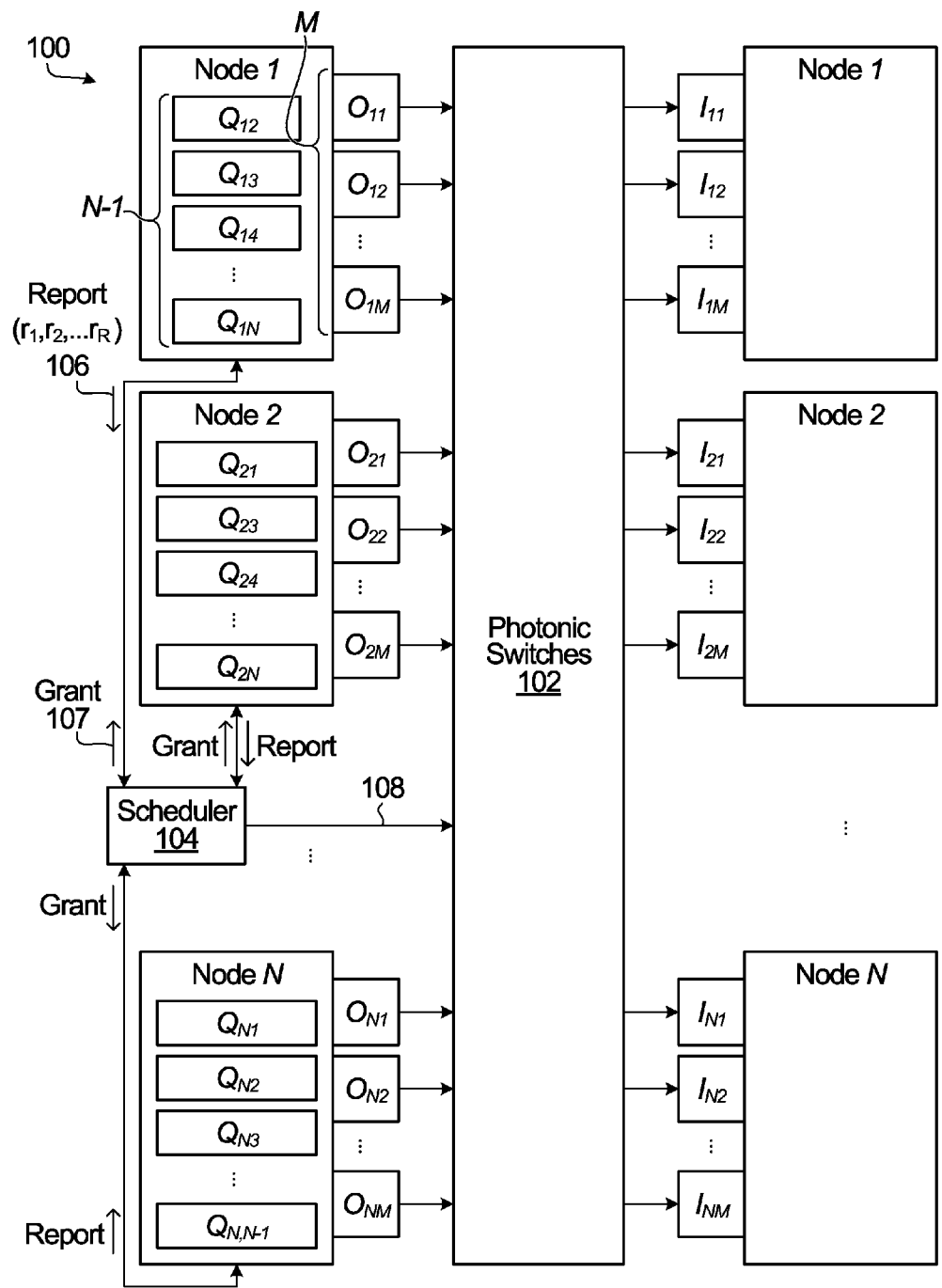
FIG. 1 is a block diagram of a photonic switching system in accordance with one embodiment.

Turning to FIG. 1, a photonic switching system 100 is illustrated having N nodes, labelled Node 1 to Node N. Each node may also be called an aggregation node or a TOR. The nodes are coupled to each other by photonic switches 102. The photonic switches 102 may be implemented as a stack of SiP switches, although more generally this need not be the case. The photonic switches may make up one or more photonic switching fabrics.

Each node has a total of M interfaces coupling the node to the photonic switches 102. Each one of the interfaces is bidirectional in that it includes an input interface (also called an input port) and a corresponding output interface (also called an output port). To more clearly illustrate this in FIG. 1, the nodes are shown twice: on the left side of the photonic switches 102 the N nodes are illustrated with their M output interfaces shown, and on the right side of the photonic switches 102 the same N nodes are illustrated with their corresponding input interfaces shown. For example, Node 1 has output interfaces $O_{11}, O_{12}, \ldots, O_{1M}$ and corresponding input interfaces $I_{11}, I_{12}, \ldots, I_{1M}$. "Input" and "output" are defined from the perspective of the nodes. That is, an output interface of a node transmits a photonic signal (which may also be called a photonic packet) from the node into the photonic switches 102, and an input interface of the node receives the photonic signal from the photonic switches 102.

Each one of the N nodes stores data in the electronic domain that is destined for the other nodes. This data may have arrived from servers (not shown) coupled to the node, and the data may ultimately be destined for one or more other servers (not shown) coupled to one or more other nodes in the system 100. The data may be stored in the nodes in any manner in any type of suitable electronic storage. One example way is illustrated in FIG. 1. Specifically, each node includes N−1 queues. The queues may also be called buffers. Each one of the queues is for storing data that is destined for one of the other nodes. For example, Node 1 includes queues $Q_{12}, Q_{13}, \ldots$ to $Q_{1N}$, and the data stored in $Q_{12}$ is destined for Node 2, the data in $Q_{13}$ is destined for Node 3, and so on. Note that there is no buffer $Q_{jj}$ in any of the nodes in this embodiment. This is because intra-node communication (e.g. communication between a first server connected to Node 1 and a second server also connected to Node 1) does not go through the photonic switches 102.

The data stored in the queues may be stored as data packets, with each data packet including a plurality of bits. Each data packet may be a formatted group or frame of data. The term "data packets" is not meant to be limited to a specific data transmission protocol. In some embodiments, the data packets stored in the queues have different lengths (i.e. the number of bits in one data packet may be different from the number of bits in another data packet). In other embodiments, the data packets have a fixed length or may be partitioned into fixed length "cells".

The queue occupancy of each queue is measured in terms of the number of data packets stored in the queue. In other embodiments, queue occupancy is measured in terms of the amount of data stored in the queue, such as the total number of bits or bytes stored in the queue (which may also be called the "length" of the queue). Queue occupancies based on the total number of packets in the queue will only be proportional to queue occupancies based on the total number of bits or bytes in the queue if each data packet has the same fixed length.

A scheduler 104 controls which nodes communicate with each other through which interfaces to send and receive data. The scheduler 104 may also configure the photonic switches 102.

The bi-directional interfaces connected to the photonic switches 102 allow for data stored at any one of the nodes to be communicated to any other of the nodes. For example, data stored at Node 1 in the electronic domain and destined for Node 2 may be converted to a photonic signal in Node 1, sent into the photonic switches 102 through one of the M output interfaces of Node 1, travel through the photonic switches 102 to arrive at one of the M input interfaces of Node 2, and possibly be converted back into the electronic domain at Node 2.

During operation, each node transmits a message to the scheduler 104. The message contains R requests to transmit data from the node to other nodes. This message is sometimes called a "Report" message, and will be referred to as such herein. The Report message of Node 1 is illustrated as 106 in FIG. 1. Its R requests are respectively labelled as $r_1, r_2, \ldots, r_R$. Each one of requests $r_1, r_2, \ldots, r_R$ is to transmit data from Node 1 to another of the nodes via one of the M photonic interfaces. In some embodiments, one or more of the requests includes an identification of a specific one of the photonic interfaces. In other embodiments, each request does not ask to use a specific one of the photonic interfaces (e.g. request $r_1$ does not specifically request to use interface $O_{11}$), and which interface to use is determined by the scheduler 104, thereby giving additional flexibility to the scheduler 104. In the examples below, each request does not ask to use a specific one of the photonic interfaces and this is instead determined by the scheduler 104.

The scheduler 104 receives the Report message from each one of the nodes, processes the requests to prioritize them in relation to the requests from the other nodes, determines which requests are to be granted, and then sends a "Grant" message to each node, the Grant message including an indication of which requests have been granted. The Grant message also indicates with interfaces are to be used. Each node then transmits data into the photonic switches 102 via one or more of its output interfaces and receives data from the photonic switches 102 via one or more of its input interfaces in the manner instructed by the Grant message. For example, the Report message 106 transmitted from Node 1 to scheduler 104 may include 3 requests: a first request $r_1$ in which the Node 1 asks to send data in $Q_{12}$ to Node 2, a second request $r_2$ in which Node 1 asks to send data in $Q_{14}$ to Node 4, and a third request $r_3$ in which Node 1 asks to send data in $Q_{1N}$ to Node N. The scheduler 104 prioritizes the three requests compared to the other requests from the other nodes, and in this example the scheduler 104 decides to grant requests $r_1$ and $r_2$. The scheduler 104 therefore sends a Grant message 107 to Node 1 that grants request $r_1$ and $r_2$. The Grant message 107 also indicates which interfaces are to be used. In this example, the Grant message 107 indicates that the data in $Q_{12}$ should be sent over interface $O_{1m}$, and that the data in $Q_{14}$ should be sent over interface $O_{12}$. The Grant message 107 sent to Node 1 also indicates which input interfaces $I_{11}, I_{12}, \ldots, I_{1M}$ (if any) are to be used to receive data from which other nodes. The scheduler 104 may also communicate with the photonic switches 102, as shown at 108, in order to appropriately configure them to transmit the photonic signals from each output interface to the designated input interface. Depending on the nature of the switches 102, there may be a constraint on which input interfaces can communicate with which output interfaces due to the chosen implementation and/or due to contention in the switching fabric. The scheduler 104 may work within such constraints and/or resolve such contentions.

Although not illustrated in FIG. 1, the switching system 100 may have a separate control layer and data layer. The control layer would be the layer of the architecture corresponding to the control functions, e.g., generating and communicating the Report and Grant messages and configuring the photonic switches 102, as necessary. The data layer would be the layer of the architecture corresponding to the data transmission, e.g., moving data packets into and out of the queues in the nodes, converting between electronic data packets and corresponding photonic signals, and transmitting and receiving the data.

The switching system 100 may be synchronous (also called slotted). In this case, the grants made by the scheduler 104, as well as the configuration of the photonic interfaces and (if necessary) the photonic switches 102, may be determined in advance in a previous time slot and may be valid only for the duration of the next time slot. The arrival of data at the switch inputs may also be synchronized for each slot despite varying delay between nodes and the switch. The scheduler 104 may provide or coordinate the synchronous functionality, and at the start of each time slot a "synchronization pulse" (e.g. GATE message) may be sent by the scheduler 104 to provide the grant information to the nodes. Synchronous photonic switching may allow for a higher throughput compared to non-synchronous switching, since in synchronous switching contention resolution may be made a priori based on the requested connectivity and also based on the fact that node-to-node connectivity is for the whole duration of the slot.

In general, there may be contention for use of the node interfaces. For example, consider the case in which each node in FIG. 1 has two bidirectional I/O interfaces, such that Node 1 has output interfaces $O_{11}$ and $O_{12}$ and corresponding input interfaces $I_{11}$ and $I_{12}$. Therefore, Node 1 has the capacity to transmit to and receive from two other nodes simultaneously. However, if three other nodes each send a request to the scheduler 104 asking to send data to Node 1, then one of the requests would need to be denied by the scheduler 104, as there are only two interfaces at Node 1 to receive data from other nodes.

In some embodiments, the number of requests R in a Report message sent by at least one of the N nodes in FIG. 1 is greater than the total number of photonic interfaces M available for transmitting data from that node. Advantageously, when contention such as that described above occurs and a request of a Node is denied by the scheduler 104, there may then be an opportunity for the scheduler to grant another request from a node, if this other request happens to be a request to send data to another node that has an interface available to receive such data, and if there is also an interface available to transmit the data from the node. The larger the number of requests for the scheduler 104 to consider, the higher the probability for additional grants.

Figure 2:
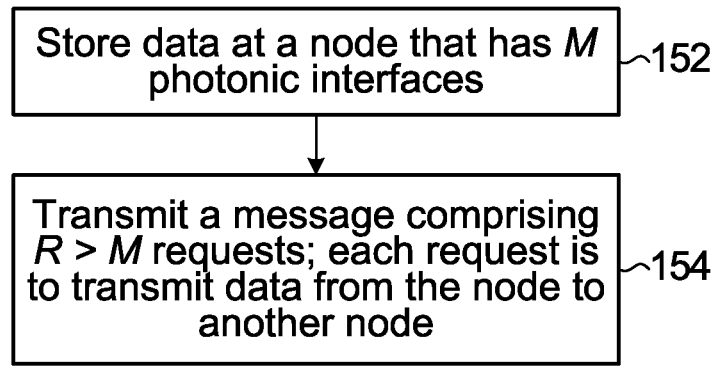
FIGS. 2 and 3 are flowcharts of example methods performed in the photonic switching system of FIG. 1.

FIG. 2 illustrates an example method consistent with the above. In step 152, data is stored at a node. The data may be stored in queues in the manner described above. The node has M photonic interfaces configured to transmit photonic signals from the node to at least one photonic switching fabric. In step 154, a message is transmitted from the node. The message comprises R requests. Each one of the R requests is to transmit data from the node to another node that is coupled to the node through the at least one photonic switching fabric. The number of requests R is greater than the number of photonic interfaces M.

More generally it should be understood that the scheduler 104 and Report messages in this embodiment accommodate R greater than M requests. However, at a given instance, if M or fewer queues in a node contain packets, the Report message of that node will not contain greater than M requests, or at least some of the requests will be null or contain zeros (or indicate lowest priority, such as by having a queue index of zero).

Apart from the interface contention issue discussed above, if the requests are granted by the scheduler 104 in order of priority, and the priority only accounts for queue occupancy, then queues that are only slightly occupied may be "starved", i.e., never or very rarely have a request granted. For example, if queue $Q_{12}$ was consistently being filled with data packets by Node 1, but queue $Q_{13}$ only had a few data packets and was rarely filled by Node 1, then the scheduler 104 may regularly grant requests to Node 1 to transmit data from queue $Q_{12}$, but rarely grant requests to Node 1 to transmit data from queue $Q_{13}$ (due to the low number of data packets in queue $Q_{13}$). This may cause a data packet in queue $Q_{13}$ to wait in the queue a relatively long time, thereby increasing the maximum delay of a packet through the switching system 100. In view of this, in one embodiment, each request in each Report message sent by each one of the N nodes includes a queue index corresponding to a respective queue in that node. The queue index is based on both: (i) queue occupancy, and (ii) a delay parameter. By the queue index being "based on" both queue occupancy and a delay parameter, it is meant that the queue occupancy is either a function of the queue occupancy and the delay parameter, or the queue index is or includes the queue occupancy and the delay parameter. In the former case, the queue index may directly indicate the priority of the request, whereas in the latter case, the scheduler 104 would extract the queue occupancy and the delay parameter from the queue index and then determine a priority of the request using these values.

The queue occupancy may be the number of data packets in the respective queue, or the amount of data in the respective queue measured in terms of the number of bytes or bits in the respective queue. The delay parameter may be based on the arrival time of the earliest-arrived packet in the respective queue. By determining the queue index based on both queue occupancy and a delay parameter, the queue index value is influenced by both criteria, which can allow the queue index to indicate a higher priority request to the scheduler 104 if either of these values becomes too large. As a simple example, Node 1 sends two requests in its Report message: a first request $r_1$ in which the Node 1 asks to send data in $Q_{12}$ to Node 2, and a second request $r_2$ in which Node 1 asks to send data in $Q_{13}$ to Node 3. Request $r_1$ includes a queue index $x_1$ that is a function of: (i) the number of data packets stored in $Q_{12}$, and (ii) the amount of time that has passed since the earliest-arrived packet stored in $Q_{12}$ arrived at $Q_{12}$. Request $r_2$ also includes a queue index $x_2$ computed the same way: a function of the number of data packets stored in $Q_{13}$ and the amount of time that has passed since the earliest-arrived packet stored in $Q_{13}$ arrived at $Q_{13}$. The queue index having the higher value is given higher priority by the scheduler 104. Therefore, even if $Q_{12}$ consistently has a large number of data packets stored in its queue and $Q_{13}$ only has a small number of data packets stored in its queue, eventually the amount of time the earliest-arrived packet sits in $Q_{13}$ will become an overriding factor and cause request $r_2$ to have a larger queue index (and therefore higher priority) compared to request $r_1$.

Figure 3:
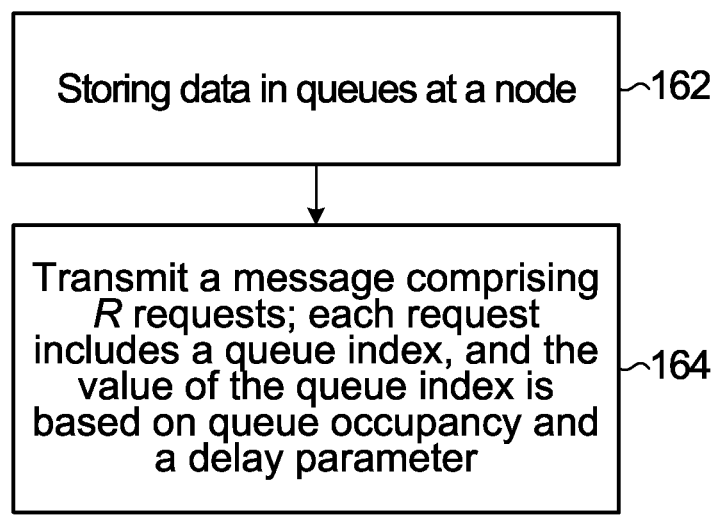

FIG. 3 illustrates an example method consistent with the above. In step 162, data is stored in queues at a node. In step 164, a message is transmitted comprising R requests. Each one of the R requests is to transmit data from the node to another node. Each one of the R requests also includes a queue index corresponding to a respective queue in the node, and the value of the queue index is based on both a queue occupancy of the respective queue and a delay parameter.

Figure 4:
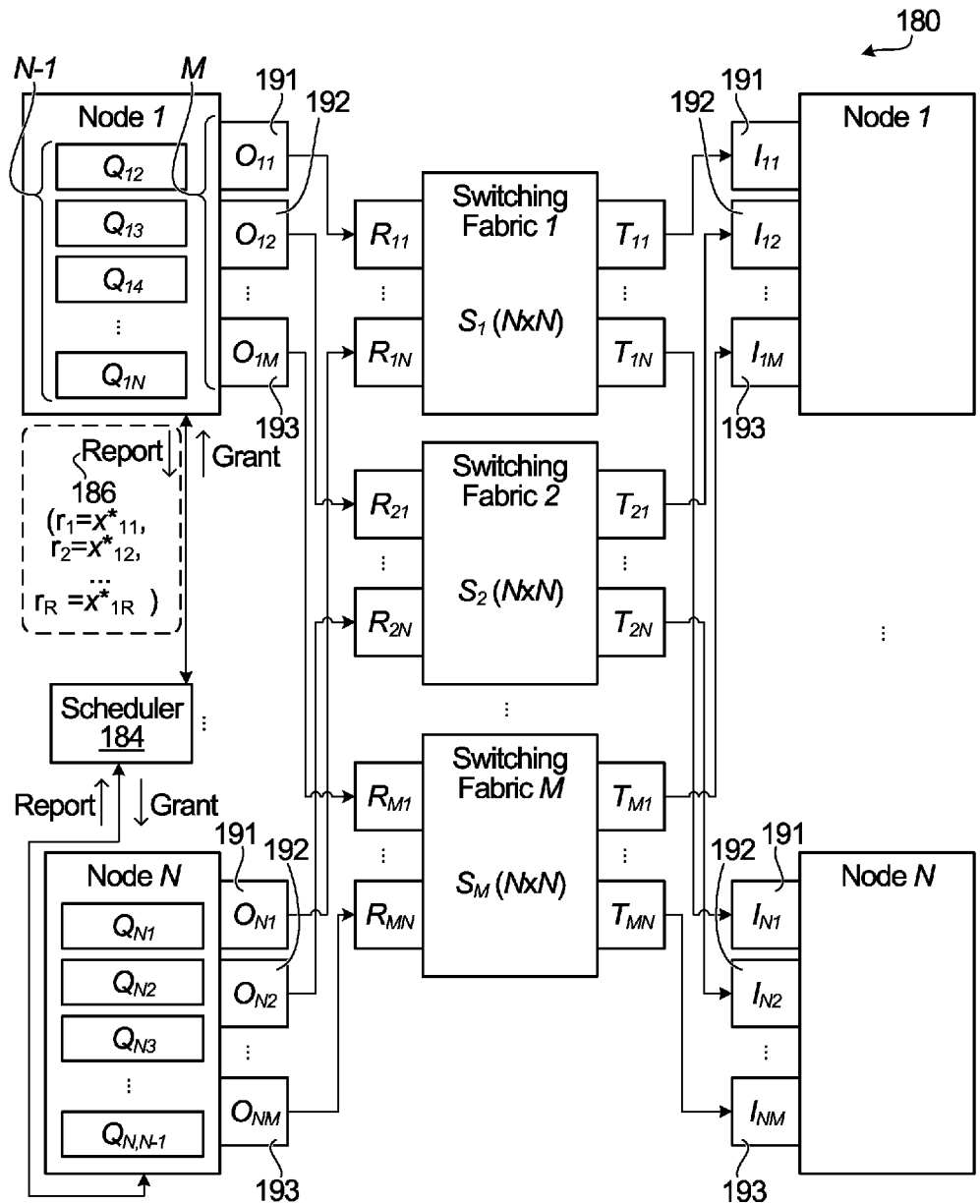
FIG. 4 is a block diagram of a photonic switching system in accordance with another embodiment.

FIG. 4 illustrates another photonic switching system 180. The photonic switching system 180 is an example implementation of the system illustrated in FIG. 1. In FIG. 4, the photonic switches 102 of FIG. 1 are M photonic switching fabrics respectively labelled $S_1$ to $S_M$. Each photonic switching fabric $S_1$ to $S_M$ is an N×N fabric that has N input ports and N output ports. For example, photonic switching fabric $S_1$ has N input ports $R_{11}$ to $R_{1N}$, each of which is to receive a photonic signal and route it to a respective one of the output ports $T_{11}$ to $T_{1N}$.

Each one of the photonic interfaces of each node is coupled to a respective one of the M photonic switching fabrics. In particular, switching fabric $S_1$ switches packets between a first interface 191 of each node, switching fabric $S_2$ switches packets between a second interface 192 of each node, . . . , and switching fabric $S_M$ switches packets between an $M^{th}$ interface 193 of each node. That is why in switching fabric $S_1$, the switch input port $R_{11}$ connects to Node 1 output photonic interface $O_{11}$, the switch input port $R_{1N}$ connects to Node N output photonic $O_{N1}$, the switch output port $T_{11}$ connects to Node 1 input photonic interface $I_{11}$, and the switch output port $T_{1N}$ connects to Node N input photonic interface $I_{N1}$. Therefore, it can be seen that each one of the M photonic switching fabrics has a corresponding interface on each node, and an interface of one node can only communicate with a corresponding interface of another node. For example, a photonic signal leaving interface $O_{11}$ of Node 1 can only be transmitted through switching fabric $S_1$ to a first interface 191 of another node. It is not possible for the photonic signal leaving interface $O_{11}$ of Node 1 to be switched to $I_{N2}$ of Node N. Each node interface is able to communicate with a corresponding interface of any other node through the switching fabric associated with that interface.

The photonic switching system 180 is synchronous, with a time slot of duration $T_S$. In operation, in every time slot, Node 1 determines a queue index for each of its N−1 queues $Q_{12}, Q_{13}, \ldots$ to $Q_{1N}$. That is, for each queue $Q_{ij}$ in Node 1, Node 1 computes a corresponding queue index $x_{ij}$ (j=1 to N−1) to obtain the set $X_1\{x_{11}, x_{12}, \ldots, x_{1,N-1}\}$. The larger the value of a particular queue index $x_{ij}$, the higher priority it is to Node 1 to be able to transmit data from the associated queue $Q_{ij}$. Node 1 then prepares a Report message 186 to send to a scheduler 184. The Report message 186 comprises R requests, i.e. $(r_1, r_2, \ldots, r_R)$. Specifically, Node 1 selects the R largest queue index values from the set $X_1$ in order to obtain the set $X^*_1 = \{x^*_{11}, x^*_{12}, x^*_{1N_R}\}$. The Report message 186 is then chosen as $(r_1=x^*_{11}, r_2=x^*_{12}, \ldots r^*_{N_R}=x^*_{1N_R})$, such that $x^*_{11}$ is the largest queue index value, $x^*_{12}$ is the second-largest queue index value, . . . , and $x^*_{1R}$ is the $R^{th}$ largest queue index value. That is $x^*_{ij} \geq \max(x_{ij}|x_{ij} \in X_1 - X^*_1)$.

The same process is performed by each of the nodes, such that in each time slot the scheduler 184 receives N Report messages (one from each of the N nodes), with each Report message having R requests, and with each of the R requests including a queue index corresponding to a respective queue in the node, the queue index value indicative of the priority of the request.

The scheduler 184 assembles the Report messages from all N nodes to result in the set:

$$X = \bigcup_{i=1}^{N} X_i^*, \; |X| = N \times N_R$$

This set X is then sorted by the scheduler 184 (e.g. using the quick sort algorithm) from highest queue value (the highest priority request) to lowest queue value (the lowest priority request). The scheduler 184 then grants each request that it is able to grant in order of priority until there are no more requests left. The grants are made in order of highest priority request to lowest priority request, but denying any request that cannot be granted due to a node interface no longer being available as a result of the node interface already being assigned to a granted higher-priority request. Some example ways to compute a queue index for a respective queue are as follows:

(1) The queue index may be set to a value that is equal to, proportional to, or a function of the number of data packets in the respective queue.

(2) The queue index may be set to a value that is equal to, proportional to, or a function of the queue length of the respective queue.

(3) The queue index may be set to a value that is equal to, proportional to, or a function of the length of time that has passed since the earliest-arrived packet in the respective queue arrived at the respective queue (i.e. the current maximum delay of the respective queue).

(4) The queue index may be based on both the queue occupancy and a delay parameter. The queue occupancy may be based on the number of data packets in the respective queue or the length of the respective queue, and the delay parameter may be based on the length of time that has passed since the earliest-arrived packet in the respective queue arrived at the respective queue. The delay parameter may be zero until a certain delay threshold is exceeded.

(5) The queue index may be computed by: (i) obtaining a first value based on queue occupancy; (ii) obtaining a maximum delay value in the respective queue based on the arrival time of the earliest-arrived packet; (iii) applying a step function to the maximum delay value to obtain a second value, the step function configured to cause the second value to be zero when the maximum delay value has not exceed a predetermined threshold; and (iv) obtaining the value of the queue index based on the first value and the second value. For example, the queue index may be computed as:

$$x_{ij} = \frac{p_{ij}}{p_{th}} + \frac{d_{ij}}{D_{th}} U(d_{ij} - D_{th}),$$

where $x_{ij}$ is the value of the queue index, $p_{ij}$ is the queue occupancy and is equal to the number of packets in the respective queue, $d_{ij}$ is the maximum delay value and is equal to the amount of time that has passed since the earliest-arrived packet in the respective queue arrived at the respective queue, $P_{th}$ and $D_{th}$ are predetermined parameters, $$\frac{p_{ij}}{P_{th}}$$

is the first value, and $U(d_{ij} - D_{th})$ is the step function used to obtain the second value. The value $P_{th}$ acts as a normalization or weighting parameter. It may be set as the minimum number of packets which can be sent in each time slot. An example value is $P_{th} = 8$. The parameter $D_{th}$ is a delay threshold, such that when $d_{ij} \geq D_{th}$, then $U(d_{ij} - D_{th}) = 1$. Otherwise, $U(d_{ij} - D_{th}) = 0$. Note that the parameter $D_{th}$ in $$\frac{d_{ij}}{D_{th}}$$

may instead be replaced with a different normalization/weighting parameter. An example value for $D_{th}$ is $D_{th} = 15T_S$, where $T_S$ is the length of a time slot. As another example, the queue index may be computed as:

$$x_{ij} = \frac{q_{ij}}{Q_{th}} + \frac{d_{ij}}{D_{th}} U(d_{ij} - D_{th}),$$

where $x_{ij}$ is the value of the queue index, $q_{ij}$ is the queue occupancy and is equal to the number of bits in the respective queue, $Q_{th}$ is a normalization or weighting parameter, $$\frac{q_{ij}}{Q_{th}}$$

is the first value, and the other parameters are defined in the paragraph above. As above, the parameter $D_{th}$ in $$\frac{d_{ij}}{D_{th}}$$

may instead be replaced with a different normalization/weighting parameter.

(6) The queue index may be computed by: (i) obtaining a first value based on the queue occupancy of the respective queue; (ii) obtaining a maximum delay value in the respective queue based on an arrival time of the earliest-arrived packet in the respective queue; (iii) applying a function to the maximum delay value to obtain a second value; and obtaining the value of the queue index based on the first value and the second value. The function may be a step function (as in (5) above). However, more generally, the function does not have to be a step function and/or does not have to cause the second value to be zero when the maximum delay value has not exceed a predetermined threshold. The function may be linear, non-linear, exponential, etc. The function may change the queue index when there is a change in the maximum delay value. The function may cause the second value to have a maximum value around or at the predetermined threshold.

To assist in further illustrating and explaining some of the principles described above, please consider the following examples.

Figure 5:
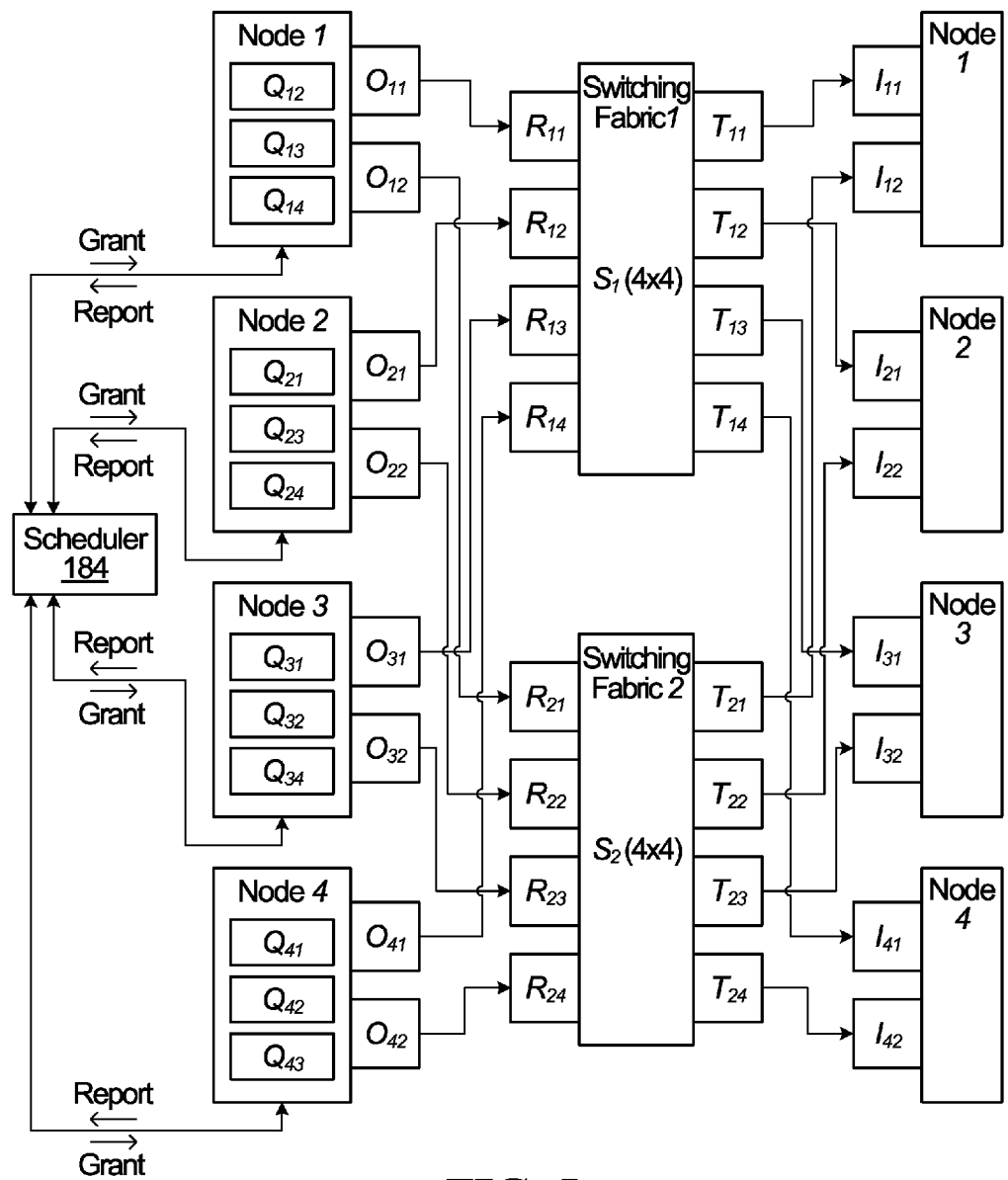
FIG. 5 is a block diagram of the photonic switching system of FIG. 4 with four nodes and two interfaces.

FIG. 5 illustrates the FIG. 4 architecture for four nodes (N=4), and each node having a total of two bidirectional interfaces (M=2) coupling the node to a photonic switching fabric. In this example, at the time each node is to send its Report message, the queue occupancy of each queue of each node is as follows:

TABLE 1

| Occupancy of each queue at each node | | | | | | | |
|---|---|---|---|---|---|---|---|
| Node 1 | | Node 2 | | Node 3 | | Node 4 | |
| Queue | Queue Occupancy | Queue | Queue Occupancy | Queue | Queue Occupancy | Queue | Queue Occupancy |
| $Q_{12}$ | 12 | $Q_{21}$ | 73 | $Q_{31}$ | 49 | $Q_{41}$ | 17 |
| $Q_{13}$ | 92 | $Q_{23}$ | 67 | $Q_{32}$ | 55 | $Q_{42}$ | 21 |
| $Q_{14}$ | 77 | $Q_{24}$ | 69 | $Q_{34}$ | 51 | $Q_{43}$ | 15 |

The queue occupancy measurement in Table 1 is in terms of number of packets in the queue $p_{ij}$, and the queue index $x_{ij}$ for each queue is computed as $$x_{ij} = \frac{p_{ij}}{P_{th}},$$

where $P_{th}=1$. Therefore, with the numbers in Table 1:

Node 1: $X_1=\{x_{11}, x_{12}, x_{13}\}=\{12, 92, 77\}$;
Node 2: $X_2=\{x_{21}, x_{22}, x_{23}\}=\{73, 67, 69\}$;
Node 3: $X_3=\{x_{31}, x_{32}, x_{33}\}=\{49, 55, 51\}$; and
Node 4: $X_4=\{x_{41}, x_{42}, x_{43}\}=\{17, 21, 15\}$.

The number of requests in each Report message sent from each queue is equal to the number of photonic interfaces, i.e. R=M=2. Therefore, for each node, the top two requests are as follows:

Node 1: $X_1=\{x^*_{11}, x^*_{12}\}=\{92, 77\}$;
Node 2: $X_2=\{x^*_{21}, x^*_{22}\}=\{73, 69\}$;
Node 3: $X_3=\{x^*_{31}, x^*_{32}\}=\{55, 51\}$; and
Node 4: $X_4=\{x^*_{41}, x^*_{42}\}=\{21, 17\}$.

Therefore, the Report message sent by each node has two requests, as follows:

TABLE 2

Report message sent by each node for R = 2.

| Node 1 | | Node 2 | | Node 3 | | Node 4 | |
|---|---|---|---|---|---|---|---|
| Request 1 | 92 ($Q_{13}$) | Request 1 | 73 ($Q_{21}$) | Request 1 | 55 ($Q_{32}$) | Request 1 | 21 ($Q_{42}$) |
| Request 2 | 77 ($Q_{14}$) | Request 2 | 69 ($Q_{24}$) | Request 2 | 51 ($Q_{34}$) | Request 2 | 17 ($Q_{41}$) |

Figure 6:
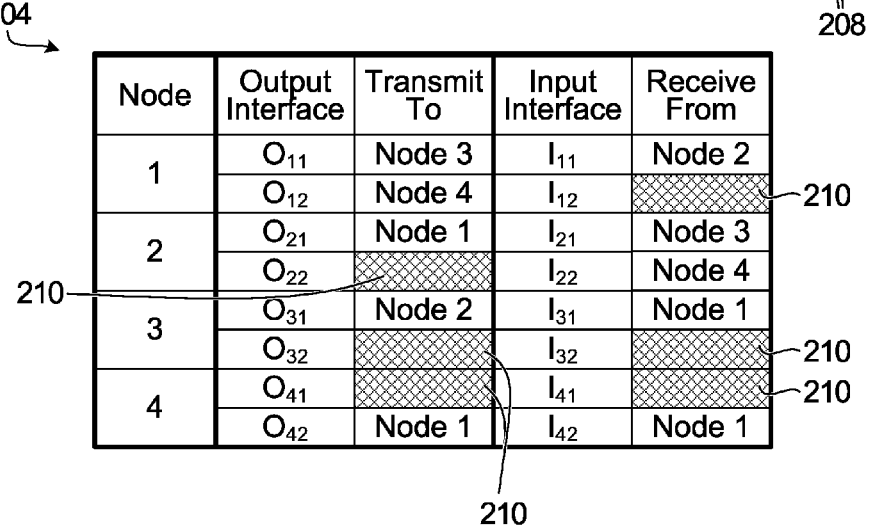
FIG. 6 illustrates tables showing the grant order, whether each request is granted or not, and the configuration of each of the 10 photonic interfaces in one example.

The scheduler 184 then assembles the set $X=\{92\ (Q_{13}), 77\ (Q_{14}), 73\ (Q_{21}), 69\ (Q_{24}), 55\ (Q_{32}), 51\ (Q_{34}), 21\ (Q_{42}), 17\ (Q_{41})\}$, and then sorts this set in order of highest queue index to lowest queue index. In this example, the queue index values already happen to be in this order. The scheduler 184 then grants each request in order of priority, but denies any request in which there is no longer both an output and corresponding input node interface available for accommodating the request. This is illustrated in FIG. 6 in which the first table 202 specifies the grant order and whether each request is granted or not, and the second table 204 specifies the configuration of each of the I/O photonic interfaces of each of the nodes. As shown at 206, the fourth-highest priority request (i.e. the request from Node 2 in which Node 2 requests to transmit data to Node 4) is not granted, as there is no longer a matching I/O interface between Node 2 and Node 4. Specifically, output interface $O_{21}$ of Node 2 is already assigned to fulfill the third-highest priority request, and output interface $O_{22}$ of Node 2 is available, but corresponding input interface $I_{42}$ is not as it is already assigned to fulfill the second-highest priority request. Similarly, as shown at 208, the sixth and eight highest priority requests are also not able to be granted. As shown at 210 in table 204, there are some node interfaces that are not being utilized.

To try to better utilize the node interfaces, each node can instead send a Report message that has a number of requests greater than the number of interfaces, i.e. R>M. Therefore, in another example, it is instead the case that R=3. In this case, for each node, the top three requests are as follows:

Node 1: $X_1=\{x^*_{12}, x^*_{12}, x^*_{13}\}=\{92, 77, 12\}$;
Node 2: $X_2=\{x^*_{21}, x^*_{22}, x^*_{23}\}=\{73, 69, 67\}$;
Node 3: $X_3=\{x^*_{31}, x^*_{32}, x^*_{33}\}=\{55, 51, 49\}$; and
Node 4: $X_4=\{x^*_{41}, x^*_{42}, x^*_{43}\}=\{21, 17, 15\}$.

Therefore, the Report message sent by each node has three requests (Request 1, Request 2, and Request 3), as follows:

TABLE 3

Report message sent by each node for R = 3.

| Node 1 | | Node 2 | | Node 3 | | Node 4 | |
|---|---|---|---|---|---|---|---|
| Request 1 | 92 ($Q_{13}$) | Request 1 | 73 ($Q_{21}$) | Request 1 | 55 ($Q_{32}$) | Request 1 | 21 ($Q_{42}$) |
| Request 2 | 77 ($Q_{14}$) | Request 2 | 69 ($Q_{24}$) | Request 2 | 51 ($Q_{34}$) | Request 2 | 17 ($Q_{41}$) |
| Request 3 | 12 ($Q_{12}$) | Request 3 | 67 ($Q_{23}$) | Request 3 | 49 ($Q_{31}$) | Request 3 | 15 ($Q_{43}$) |

The scheduler 184 then creates the set $X=\{92\ (Q_{13}), 77\ (Q_{14}), 12\ (Q_{12}), 73\ (Q_{21}), 69\ (Q_{24}), 67\ (Q_{23}), 55\ (Q_{32}), 51\ (Q_{34}), 49\ (Q_{31}), 21\ (Q_{42}), 17\ (Q_{41}), 15\ (Q_{43})\}$, and then sorts this set in order of highest queue index to lowest queue index to result in: $\{92\ (Q_{13}), 77\ (Q_{14}), 73\ (Q_{21}), 69\ (Q_{24}), 67\ (Q_{23}), 55\ (Q_{32}), 51\ (Q_{34}), 49\ (Q_{31}), 21\ (Q_{42}), 17\ (Q_{41}), 15\ (Q_{43}), 12\ (Q_{12})\}$. The scheduler 184 then grants each request in order of priority, but denies any request in which there is no longer both an input and corresponding output node interface available for accommodating the request. This is illustrated in FIG. 7 in which the first table 252 specifies the grant order and whether each request is granted or not, and the second table 254 specifies the configuration of each of the I/O photonic interfaces of each of the nodes. Note that, as shown at 256, the fourth-highest, seventh-highest, tenth-highest, eleventh-highest, and twelfth-highest priority requests are not granted, as an input and/or output photonic interface was not available. However, due to the additional request in each Report message, the node photonic interfaces are better utilized compared to table 204 in FIG. 6. Notably, as shown at 258 in table 254 of FIG. 7, there is only one I/O interface not utilized ($O_{41}$ and $I_{41}$).

In the examples described above with respect to FIGS. 5 to 7, the queue index $x_{ij}$ for each queue is computed as $$x_{ij} = \frac{p_{ij}}{P_{th}},$$

where $P_{th}=1$. However, as described earlier, the queue index $x_{ij}$ may additionally or instead be based on a delay parameter. In this case, Table 1 above may be modified to have another column for each node storing such a parameter. An example of this is shown as follows, in which $p_{ij}$ is the number of data packets in the queue and $d_{ij}$ is the delay in terms of how many time slots the earliest-arrived packet in the queue has been waiting:

TABLE 4

Number of packets and maximum delay in each queue.

| Node 1 | | | Node 2 | | | Node 3 | | | Node 4 | | |
| --- | --- | --- | --- | --- | --- | --- | --- | --- | --- | --- | --- |
| Queue | $p_{ij}$ | $d_{ij}$ | Queue | $p_{ij}$ | $d_{ij}$ | Queue | $p_{ij}$ | $d_{ij}$ | Queue | $p_{ij}$ | $d_{ij}$ |
| $Q_{12}$ | 12 | 4 | $Q_{21}$ | 73 | 8 | $Q_{31}$ | 49 | 5 | $Q_{41}$ | 17 | 11 |
| $Q_{13}$ | 92 | 10 | $Q_{23}$ | 67 | 11 | $Q_{32}$ | 55 | 8 | $Q_{42}$ | 21 | 13 |
| $Q_{14}$ | 77 | 7 | $Q_{24}$ | 69 | 9 | $Q_{34}$ | 51 | 6 | $Q_{43}$ | 15 | 16 |

The queue index $x_{ij}$ for each queue may then be computed based on one or both of $p_{ij}$ and $d_{ij}$. However, by being based on both, the priority of the request (i.e. the magnitude of the queue index) grows with either a large number of packets or a large maximum delay.

In the examples described above with respect to FIGS. 5 to 7, the nodes compute and send the queue indexes, rather than having the queue indexes computed at the scheduler 184 using information sent by the nodes. This assists in reducing the complexity at the scheduler 184 and may also reduce the amount of data that needs to be sent to the scheduler 184 and the required bandwidth of the interface between the scheduler 184 and the nodes.

Figure 8:
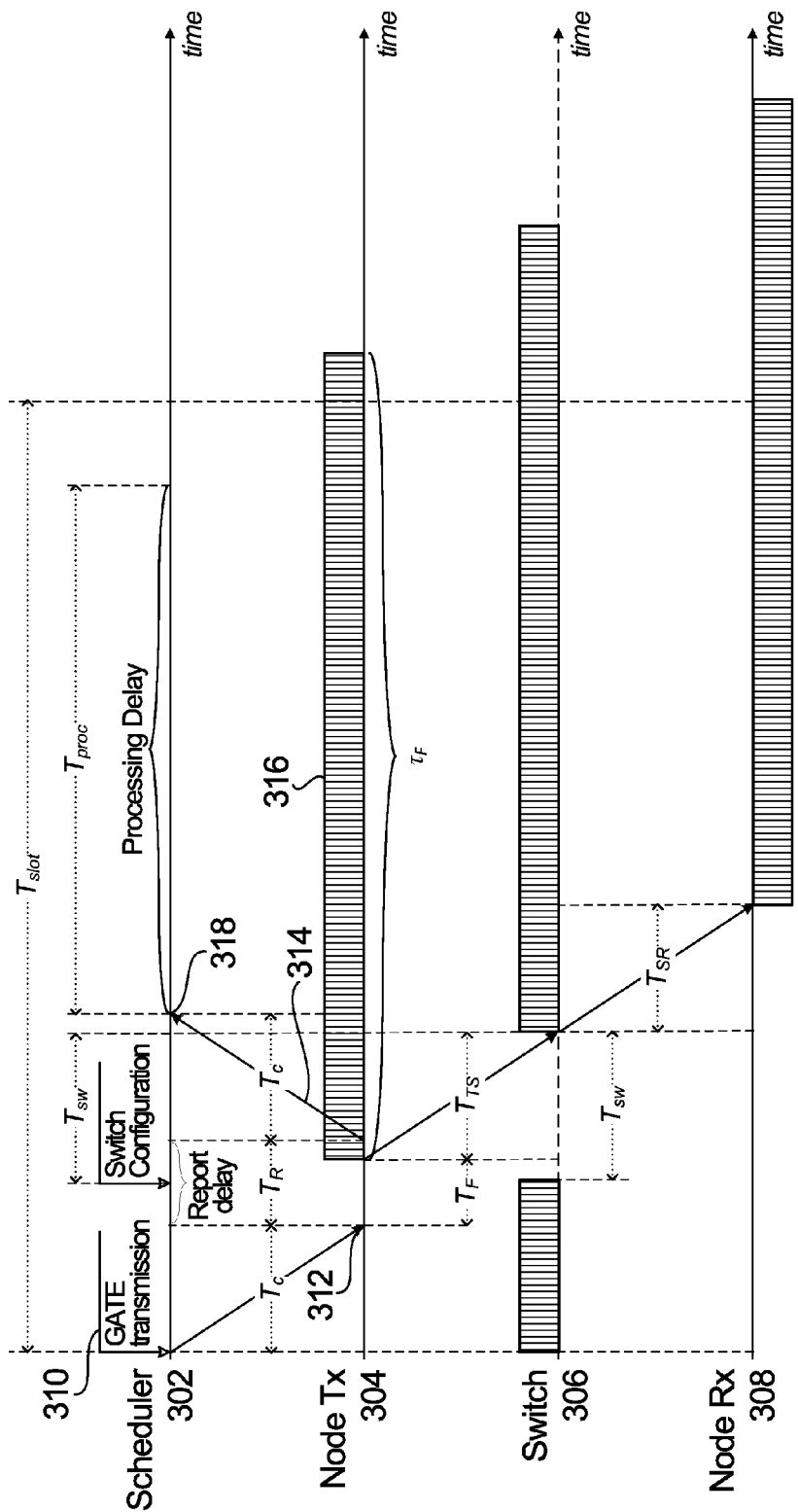
FIG. 8 is a timing diagram for a synchronous photonic switching system in accordance with one embodiment.

FIG. 8 shows a timing diagram for a synchronous photonic switching system in accordance with one embodiment. On the horizontal axis of FIG. 8 is time, and on the vertical axis there is listed: scheduler 302; Node Tx 304, which represents the transmission interface of a particular Node in the switching system; switch 306; and Node Rx 308, which represents the receive interface of the particular node.

At the start of a time slot $T_{slot}$, the scheduler 302 transmits a Gate message 310 that both carries the Grant message for that time slot and instructs the Node to send a Report message requesting grants for the next time slot. When the Node receives the Gate message 310 $T_c$ after transmission (as shown at 312), the Node computes its queue indexes and constructs the Report message making requests for the next time slot. The time to compute the queue indexes and construct the Report message is designated as delay $T_R$. This Report message is then sent to the scheduler 302 from the Node's Tx interface 304, as shown at 314. Meanwhile, the Node also processes its grant message for the current time slot and waits for a predetermined delay $T_F$ before beginning transmitting data packets 316 into the switch 306. The delay $T_F$ may be different for each node in the switching system and is so that all packets transmitted from all nodes enter into the photonic switches at substantially the same time. The delay $T_F$ ensures that nodes physically closer to the scheduler 302 (and that therefore receive and process their grant messages first) wait for the nodes that are farther away from the scheduler 302 (and that therefore receive and process their grant messages later). By appropriately setting the delay $T_F$ in each node, the point in the time slot at which all packets transmitted from all nodes enter the switches can be made substantially the same.

At the end of delay $T_F$, the Node Tx interface 304 begins transmitting its data packets 316 into the switch 306 for a duration $T_F$. The node will transmit as many data packets as possible in the duration $T_F$. The time it takes the data packets to enter the switch 306 from the Node is $T_{TS}$. Note that there is also a duration of time $T_{SW}$ for the switch to be reconfigured each time slot. The switch is reconfigured before arrival of the data packets. Data packets coming from other nodes through the switch are received on the Node Rx interface 308 at a time $T_{TS}+T_{SR}$ later. $T_{SR}$ represents the time taken to travel from the switch output to the node. $T_{TS}+T_{SR}$ also captures the amount of time the photonic signal spent travelling through the switch 306 itself.

At time 318 the scheduler 302 receives the Report message for the next time slot from the Node. The scheduler 302 then processes the Report message and determines the grants for the next time slot. This occurs during processing delay $T_{proc}$.

The duration of the timing parameters in FIG. 8 is limited as follows: (1) $T_{proc} \leq T_{slot} - (2T_c + T_R)$; (2) $T_F \leq T_{SW} \leq T_c + T_F + T_{TS}$; and (3) $T_F \leq T_{slot} - T_{SW}$.

Returning to FIG. 4, each one of the photonic interfaces of each one of the nodes is connected to the corresponding photonic interface of each other node through an N×N photonic switching fabric. In another embodiment, each switching fabric $S_1$, $S_2$, . . . , $S_M$ may be replaced with a plurality of switching fabrics comprised of a set of smaller photonic switches to allow for scalability to a larger number of nodes. Examples of such an architecture are described with respect to FIGS. 9 to 12.

Figure 9:
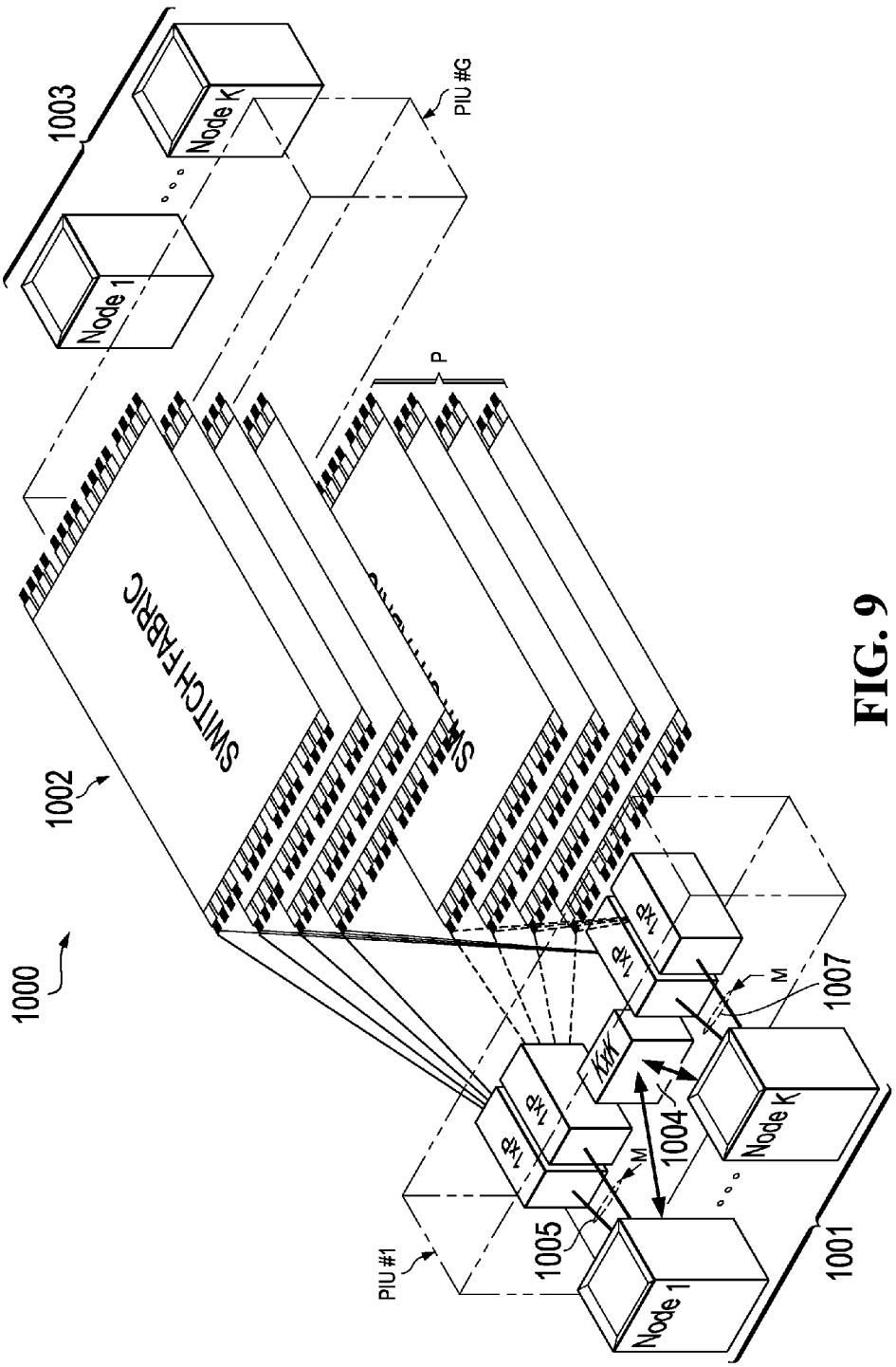
FIG. 9 is a 3-D illustration of a photonic switching system in accordance with another embodiment.

In FIG. 9 an architecture 1000 is illustrated in which there are G groups of nodes. Two of the groups of nodes are shown in FIG. 9 as group 1001 and group 1003. Each group has K nodes, labelled Node 1 to Node K. Each node in each group has M interfaces, as illustrated at 1005 and 1007. Each group of K nodes is optically coupled to a corresponding photonic interface unit (PIU). There are G PIUs, two of which are illustrated in FIG. 9: PIU #1 and PIU #G. PIU #1 is illustrated in more detail in FIG. 9, and will be described below. The other PIUs have components similar to PIU #1.

PIU #1 includes a K×K silicon photonic (SiP) switch 1004 that intraconnects each of the K nodes, allowing each of the K nodes to send data between themselves. Each one of the M interfaces of each node also connects to a respective 1×P switch. Each 1×P switch connects each interface of each node to one of P switching fabrics 1002. In FIG. 9, P=4. The total number of switching fabrics 1002 is M*P, where * represents multiplication.

Figure 10:
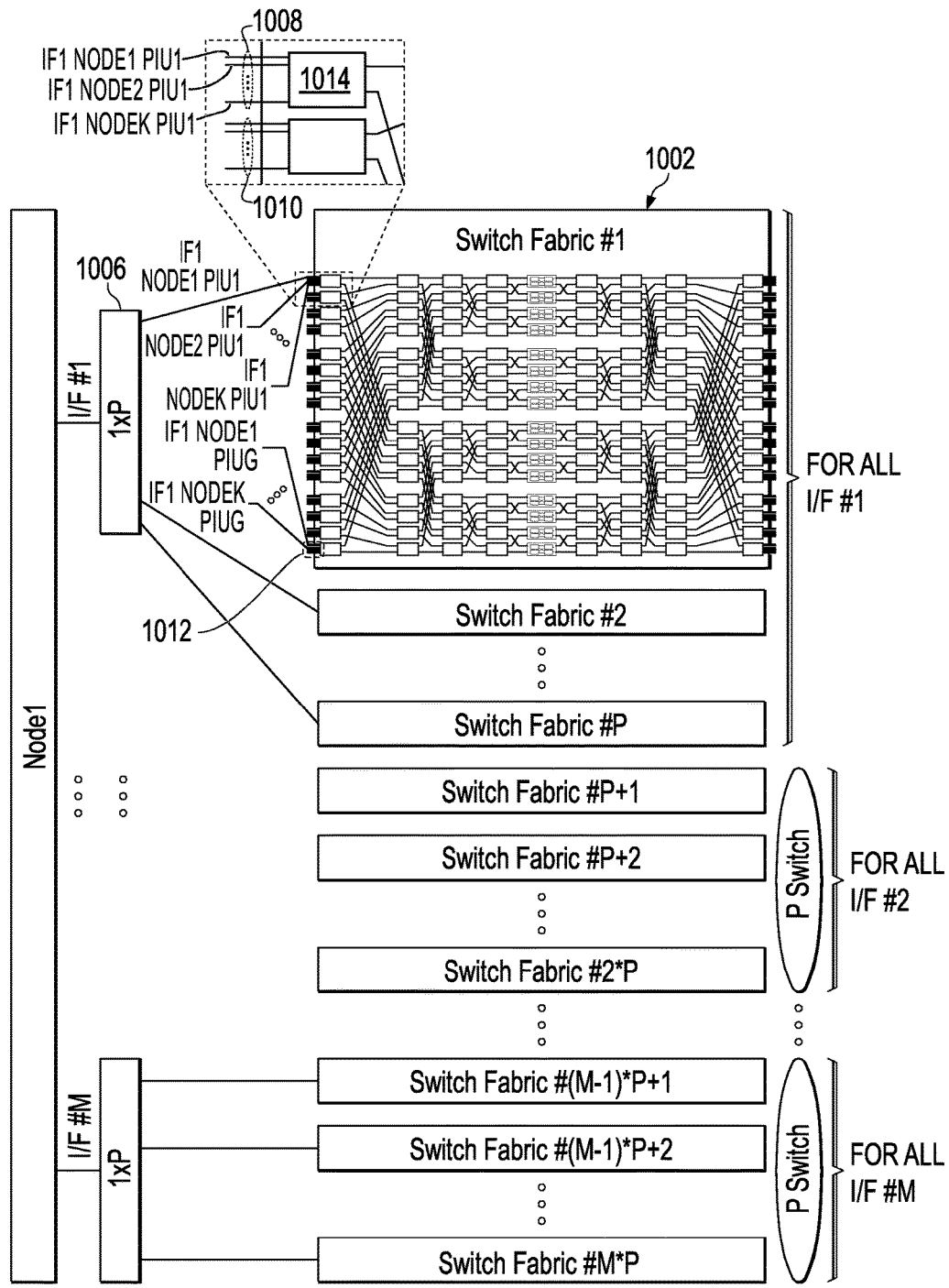
FIG. 10 is an illustration showing in more detail the connection of the nodes in FIG. 9 to the switching fabrics in FIG. 9.

The G PIUs and the M*P switching fabrics 1002 in FIG. 9 allow an interface of any node in FIG. 9 to communicate with a corresponding interface of any other node in FIG. 9. However, FIG. 9 achieves this in a way that also allows for scalability to support a large number of total nodes N=G×K. To better assist in appreciating this, FIG. 10 illustrates in more detail the actual connection of the nodes to the switching fabrics 1002. Each switching fabric 1002 in FIG. 10 is labelled as SWITCH FABRIC #1, SWITCH FABRIC #2, . . . , SWITCH FABRIC #M*P for convenience. Interface IF#1 of Node 1 connects to 1×P switch 1006, which fans the output of IF #1 to P switching fabrics 1002 (SWITCH FABRIC #1 to SWITCH FABRIC #P). SWITCH FABRIC #1 is shown in more detail in FIG. 10 and it has G sets of inputs. G=16 in the illustrated example. Each one of the G sets corresponds to a respective PIU, and each one of the G sets has K inputs. The first of the G sets of inputs is shown at 1008 in FIG. 10. This set 1008 of inputs specifically has K inputs, the first for receiving IF #1 of Node 1 in PIU#1, the second for receiving IF #1 of Node 2 in PIU#1, . . . , and the K$^{th}$ input for receiving IF #1 of Node K in PIU #1. The second set of the G sets of inputs is shown at 1010 and it is for receiving IF #1 of Node 1 in PIU#2, IF #1 of Node 2 in PIU#2, . . . , and IF #1 of Node K in PIU #2. This continues with each one of the G sets of inputs receiving IF #1 of each node in the PIU served by that set. As shown in FIG. 10, the last set of inputs 1012 in SWITCH FABRIC #1 is for receiving IF #1 of Node 1 in PIU#G, IF #1 of Node 2 in PIU#G, . . . , and IF #1 of Node K in PIU #G. Each group of K inputs is coupled to a K×1 fan-in switch that only accepts one of the K inputs. For example, the K inputs of set 1008 are coupled to K×1 fan-in switch 1014. Note that K×1 fan-in switch 1014 is shown having K inputs, but appears to have two outputs (not one). This is an implementation detail: in the figure the single output of the K×1 switch has been combined with a subsequent 1×2 switch in the switching fabric 1002 to save on the total number of switches needed. That is, in this specific example, a K×1 is combined with an adjacent 1×2 to obtain the equivalent of a K×2.

SWITCH FABRIC #1 is repeated P times, so that there is P redundancy to have the switch capacity greater than I/O capacity.

In operation, SWITCH FABRIC #1 allows for IF#1 of any one of the G×K nodes to communicate with IF#1 of any other of the other G×K nodes. Contention is handled by the P switch redundancy. For example, if a packet exiting IF #1 of Node 2 in PIU 1 is destined for IF #1 of Node 7 in PIU G, it may travel through SWITCH FABRIC #1, except that if the path the packet would need to travel in SWITCH FABRIC #1 is already granted to another pair of communicating nodes, then it can travel through any one of SWITCH FABRIC #2 to SWITCH FABRIC #P, if an appropriate communication path is available in any one of these other P−1 switches. One reason there may be contention is due to the use of the fan-in switches (e.g. switch 1014). For example, if IF #1 of Node 1 of PIU #1 and IF #1 of Node 2 of PIU #1 are both trying to send a data packet through the switching system, they would not both use SWITCH FABRIC #1, as there may be a collision at fan-in switch 1014. Instead, one would use one of SWITCH FABRIC #2 to SWITCH FABRIC #P. Similarly, there may also be contention due to the use of corresponding fan-out switches at the output of each switching fabric 1002.

Each switching fabric 1002 may be called a $G_K \times G_K$ switching fabric, as it can be considered a G×G switch with each of the G inputs receiving one of K inputs, and each of the G outputs fanning out to one of K outputs.

Figure 11:
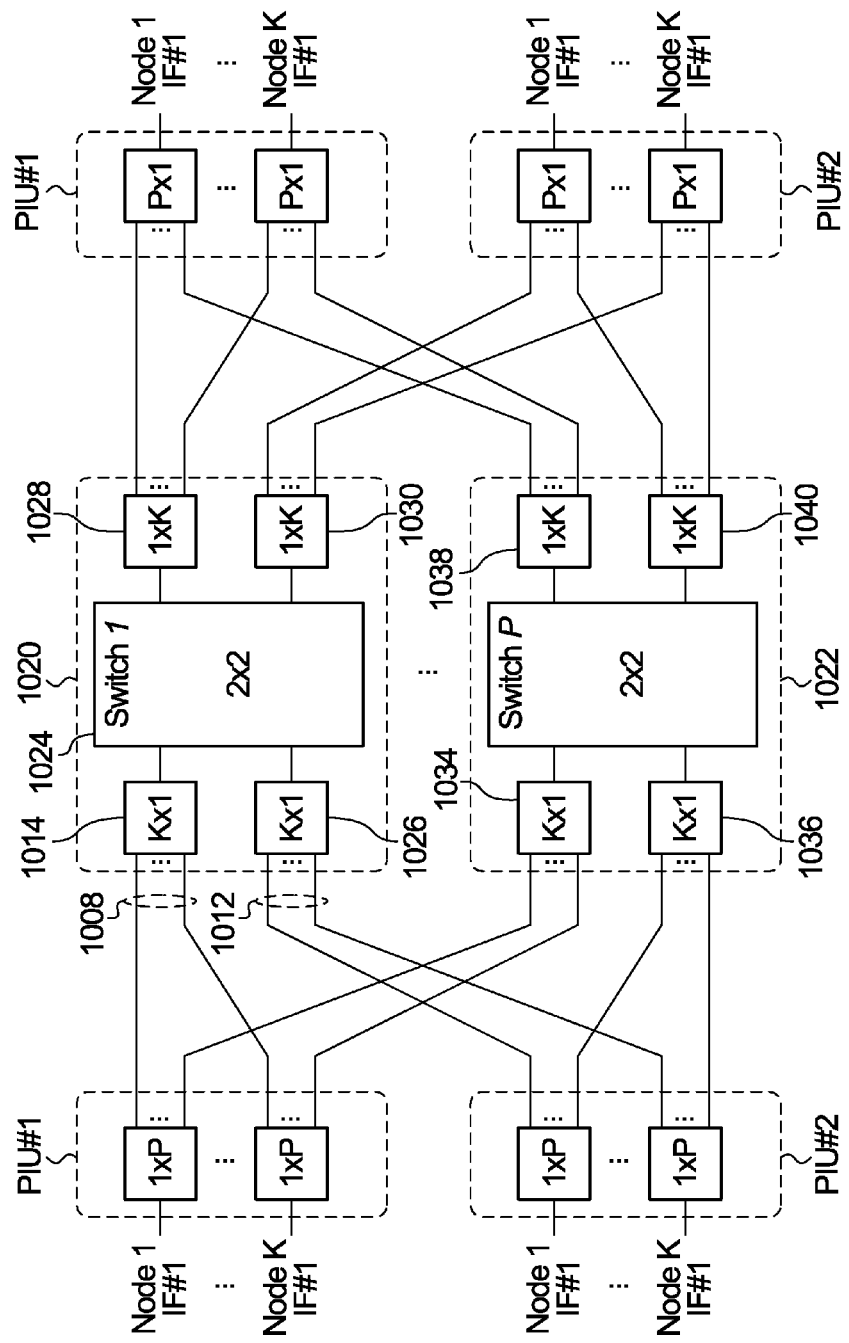
FIG. 11 is a simplified block diagram showing the FIGS. 9 and 10 embodiment for the case where there are two photonic interface units (PIUs)

To further assist in understanding, FIG. 11 illustrates the FIG. 9 and FIG. 10 architecture, but for G=2, and only showing the output of IF #1 of each node. Reference characters 1008, 1012, and 1014 are also shown in FIG. 11.

Since G=2 in FIG. 11, there are only two PIUs, which are labelled PIU #1 and PIU #2. IF #1 of each node in each PIU fans out to one of P switching fabrics. A first switching fabric 1020 and a P$^{th}$ switching fabric 1022 are illustrated in FIG. 11. The first switching fabric 1020 includes a G×G=2×2 switch labelled as Switch 1, which receives as its inputs the output of two K×1 fan-in switches (one for each PIU), which are labelled as 1014 and 1026. Two corresponding 1×K fan-out switches 1028 and 1030 connect the output of Switch 1 to output ports of the nodes. The P$^{th}$ switching fabric 1022 includes a G×G=2×2 switch labelled as Switch P, which receives as its inputs the output of two K×1 fan-in switches (one for each PIU), which are labelled as 1034 and 1036. Two corresponding 1×K fan-out switches 1038 and 1040 connect the output of Switch P to output ports of the nodes.

K×1 fan-in switch 1014 couples IF #1 of each of the nodes in PIU #1 to Switch 1, whereas K×1 fan-in switch 1034 couples IF #1 of each of the nodes in PIU #1 to Switch P. K×1 fan-in switch 1026 couples IF #1 of each of the nodes in PIU #2 to Switch 1, whereas K×1 fan-in switch 1036 couples IF #1 of each of the nodes in PIU #2 to Switch P.

In operation, IF #1 of any of the nodes in the two PIUs can communicate with IF #1 of any other of the nodes in the two PIUs through any one of the P 2×2 switches.

The point of the examples of FIGS. 9 to 11 is to show that the one or more switching fabrics that interconnect the nodes can be achieved in various ways, and with varying levels of redundancy. For example, if each node has four photonic interfaces, and each photonic interface is connected to four switching fabrics, there are 16 different ways for a given node to communicate with another node. In this particular example, if a request is simply a request to communicate from node A to node B, then when the scheduler is going through the requests, it has 16 options for each request. On the other hand, if the request is a request to communicate from node A to node B using a specific photonic interface C, then the scheduler only has four options.

Figure 12:
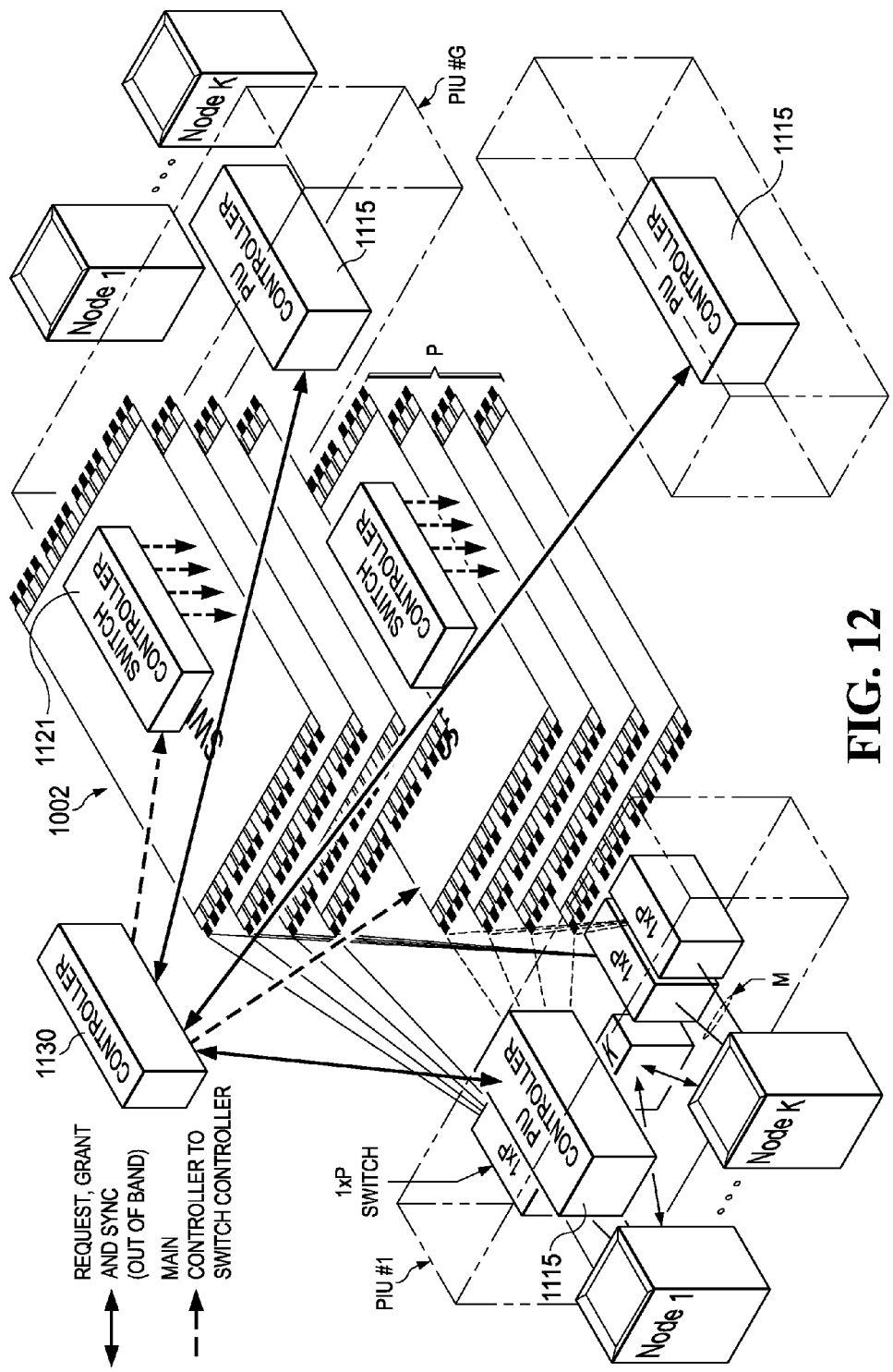
FIG. 12 is a 3-D illustration of an example photonic switching system including controllers.

FIG. 12 illustrates the addition of a central controller 1130 to the architecture of FIG. 9. The central controller 1130 may be considered an example of the scheduler 184 in FIG. 4. FIG. 12 also illustrates the addition of dedicated switch controllers 1121 and PIU controllers 1115. The controllers may be any suitable processing chips (e.g., CPUs) that are connected to their respective switch elements or embedded in the same chip with the switch elements.

In operation, the central controller 1130 assigns time slots to each node on any available switching fabric 1002. The central controller 1130 may communicate with dedicated PIU controllers 1115 associated with the PIUs, and with the switch controllers 1121 associated with the core switching fabrics 1002. The PIU controllers 1115 can communicate requests, grants and synchronization information with the central controller 1130, to switch the data from/to the nodes. The central controller 1130 can also communicate with the switch controllers 1121 to determine the switching of the data in the core switching fabrics 1002. In this embodiment, the communications between the controllers are separate from the switched data paths between the nodes. All incoming data transmissions are also synchronized to assist in simpler control.

The control architecture illustrated in FIG. 12 comprises two layers of control: a master layer (by the central controller 1130) and a local layer (by the PIU controller 1115 and the switch controller 1121). The centralized controller 1130 provides switch synchronization and contention scheduling. The centralized controller 1130 sends a synchronization pulse for each time slot, and processes the requests for transmissions from the nodes at the beginning of each time slot. The requests may be out-of-band (at a different frequency band than the data band). The centralized controller 1130 assigns time slots on various switches for the next time slot, and then sends grants to the node (e.g., in the middle of a time slot). Thus, the connection map of the silicon photonic chip switches is configured for the next time slot.

The functions of the PIU controller 1115 include deciding on intra-group or inter-group connections and interfacing between nodes of a group and the centralized controller 1130, as necessary, to deliver messages between the two. In the case of inter-group connections, the PIU controller 1115 may send a request out-of-band (out of data frequency band) in the beginning of each time slot, and monitor whether a grant has arrived from the central controller 1130 in the middle of the time slot. In the case of intra-group connections, the PIU controller may 1115 receive requests for intra-group communications and, after resolving contention, issue grants to nodes and set up the K×K intra-group switch for the connection map between the K nodes.

Alternatively, the control architecture illustrated in FIG. 12 may be distributed. In such an implementation, controller 1130 can communicate with the PIU controllers 1115 and the switch controllers 1121 to cooperatively assign time slots to each node on any available core switching fabric 1002. The various controllers may also communicate requests, grants and synchronization information between each other, to switch the data from/to the nodes and through the core switching fabrics 1002. The function of the main controller 1130 may be to coordinate such communications between the other controllers. The PIU controllers 1115 and the switch controllers 1121 make the various switching decisions and requests needed by cooperating among each other through direct communication and/or through the main controller 1130. A hybrid approach in which the control architecture is partly centralized and partly distributed is also possible.

In view of FIGS. 9 to 12, it will be appreciated that more generally an architecture is contemplated that includes a PIU with a switch that optically couples an output of a first photonic interface of a node to each of P switching fabrics. In some embodiments, the PIU may optically couple K of the N nodes to a plurality of switching fabrics, and at least one of the switching fabrics has a fan-in switch that is configured to receive as its input: (i) the output of the first photonic interface of a first node associated with the PIU and (ii) the output of (K−1) other photonic interfaces, each one of the K−1 other photonic interfaces being a respective first photonic interface of K−1 other nodes associated with the PIU . . . K is equal to a number of nodes associated with the PIU. In some embodiments, there is provided one or more G×G switching fabrics, and the input of each switching fabric is connected to K inputs through a fan-in switch, and the output of each switching fabric is connected to K outputs though a fan-out switch. In some embodiments, a fan-in switch may be configured to receive as its input an output of a particular photonic interface of each of the K nodes.

Simulations were performed for a photonic switching system having 64 nodes (i.e. N=64), with each node having eight interfaces (i.e. M=8). The switch data rate was set as 100 Gb/s. The photonic switching system was synchronous with a transmission period (slot size) of $T_S$=1 μsec. The data packet size was variable, with each packet size being between 64 and 1518 bytes, and the traffic distribution was Poisson.

Figure 13:
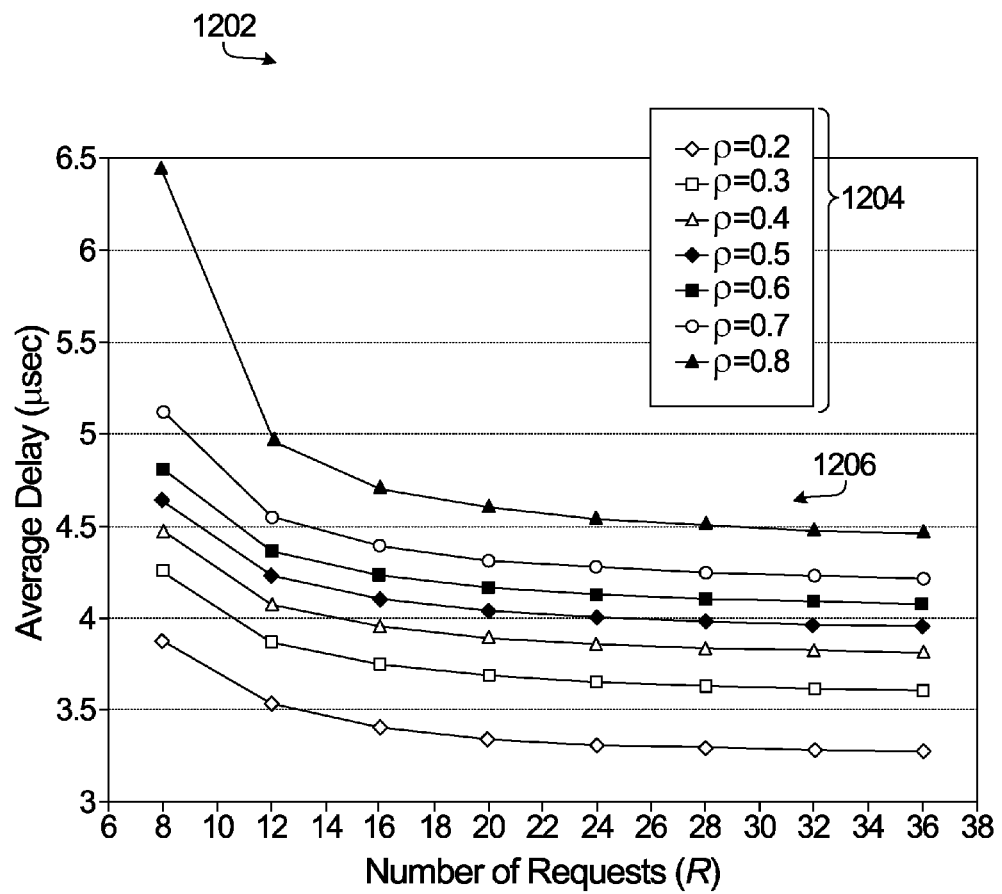
FIGS. 13 to 15 are graphs showing simulation results.

FIG. 13 illustrates a first graph 1202, which plots average delay (in μsec) on the vertical axis versus number of requests R on the horizontal axis. In the simulations illustrated in FIG. 13, the queue index is computed using the following equation described earner:

$$x_{ij} = \frac{p_{ij}}{P_{th}} + \frac{d_{ij}}{D_{th}} U(d_{ij} - D_{th}),$$

which incorporates both the number of data packets in the queue ($p_{ij}$) and the maximum delay in the queue ($d_{ij}$).

A different plot is shown on the graph 1202 for each value of offered load or throughput (p) through the switching system, as indicated by legend 1204.

As can be seen from graph 1202, the average delay of a packet through the switching system declines as the number of requests grows, although each curve begins to plateau for a larger number of requests, as shown at 1206. In the specific simulations illustrated in FIG. 13, having the number of requests R be 12, which is 1.5 times the number of interfaces per node, seems to provide a good balance between reduction in average delay and increased complexity due to having to deal with more requests per Report message than number of interfaces.

Figure 14:
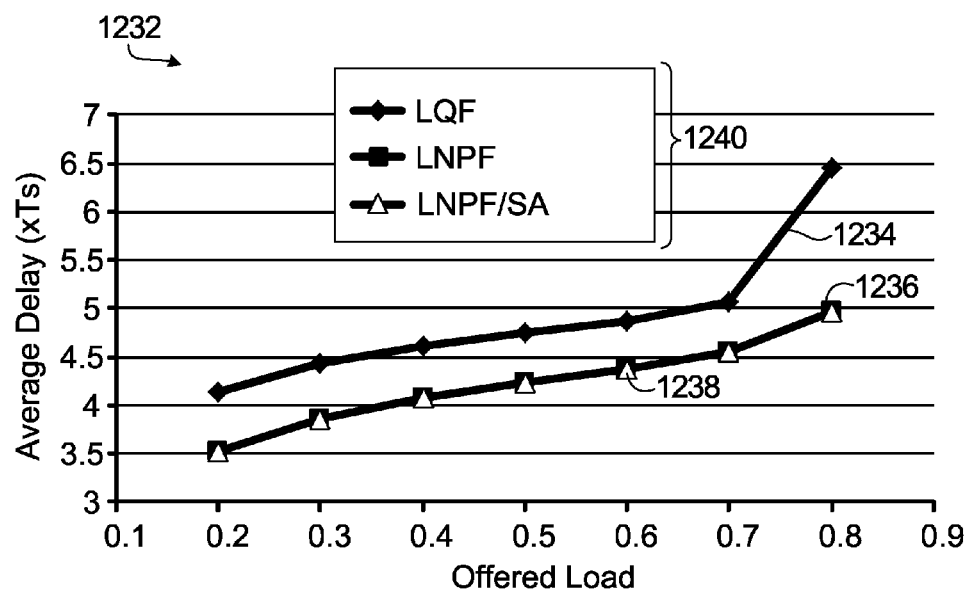

FIG. 14 illustrates a second graph 1232, which plots average delay in terms of multiples of the transmission period $T_S$ on the vertical axis, versus offered load on the horizontal axis. Three plots are present on the graph 1232 and identified by legend 1240: plot 1234, plot 1236, and plot 1238. Plot 1234 shows the average delay versus offered load for "Longest Queue First (LFQ)", which is when the number of requests in each Report message equals the number of interfaces at each node (i.e. R=M) and the queue index is computed using the number of bytes in each queue and not a delay parameter. Plot 1236 shows the average delay versus offered load for "Largest Number of Packets First (LNPF)", which is when the queue index is computed using the number of data packets in each queue and not a delay parameter. In plot 1236 R=12, that is, the number of requests per Report message is 12, which is 1.5 times the number of interfaces per node. Plot 1238 shows the average delay versus offered load for "LNPF with Starvation Avoidance (LNPF/SA)", which is LNPF, but with the queue index being computed using the number of data packets in each queue and a delay parameter. More specifically, in the LNPF/SA implementation of this simulation, the queue index is computed as $$x_{ij} = \frac{p_{ij}}{P_{th}} + \frac{d_{ij}}{D_{th}} U(d_{ij} - D_{th}).$$

As can be seen in FIG. 14, the average delay is reduced by using LNPF or LNPF/SA instead of using LQF. However, in this simulation the average delay does not appear to be significantly different between LNPF and LNPF/SA, which is why plots 1236 and 1238 are almost on top of each other.

Figure 15:
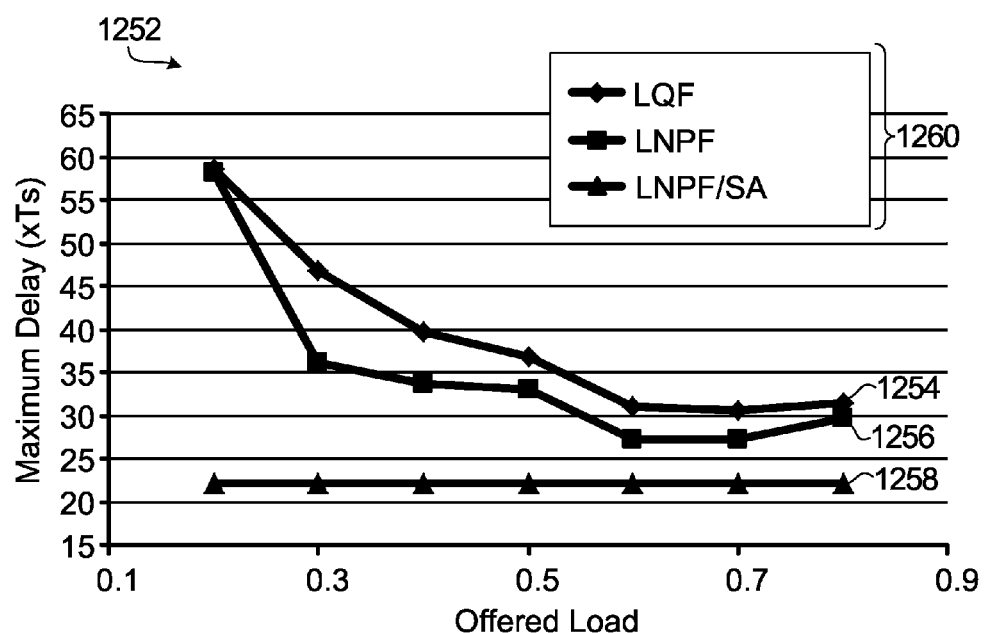

FIG. 15 illustrates a third graph 1252, which plots maximum delay in terms of multiples of the transmission period $T_S$ on the vertical axis, versus offered load on the horizontal axis. Again, three plots are present on the graph 1252 and identified by a legend 1260: plot 1254, which represents LQF as described above; plot 1256, which represent LNPF as described above; and plot 1258, which represents LNPF/SA as described above. As shown at plot 1258, by using LNPF/SA the maximum delay is reduced and is essentially a flat horizontal line across all offered loads. This is because the LNPF/SA incorporates into the queue index the maximum delay parameter, which causes the queue index to increase once the amount of time the earliest-arrived packet has waited in the queue exceeds a certain threshold. That is, the maximum delay is limited because the priority of the request (i.e. the queue index value) is increased once the delay in the queue exceeds a certain threshold.

From the above, it can be seen that in some embodiments the efficiency may be improved in terms of reducing the average and maximum packet delay through the switching system (e.g. as in LNPF/SA). In some embodiments the interfaces may be used more efficiently by having the number of requests exceed the number of interfaces, which may reduce average delay. Also, the computational cost may be kept in check since the computational change on the node side focuses only on how the queue indexes are computed, and the number of requests per Report message (R) may be kept reasonable.

It will be clear from the foregoing that many variations are possible, some of which were explicitly discussed. A few additional variations will now also be explicitly mentioned. The I/O interfaces of the nodes may be implemented using physically separate input and output interfaces. If physically separated, it may be the case that the number of input interfaces differs from the number of output interfaces. For example, with respect to FIG. 1, Node 1 may have M interfaces for transmitting photonic signals into the photonic switches 102, but Node 1 may have a different number of input interfaces for receiving photonic signals from the switches. Also, the number of interfaces does not have to be the same for each node. For example, some nodes could have fewer than M interfaces. In some embodiments, M may be the maximum number of interfaces that a node may have, and some nodes may have fewer than M interfaces. In the PIU architecture described above with reference to FIGS. 9 to 12, the number of nodes in each PIU does not have to be the same. The details of how the PIU architecture is implemented may also be varied in other ways recognizable to a person skilled in the art. As one example, M interfaces of a node may instead connect to an M×P switch, rather than the structure illustrated in FIG. 9 of M 1×P switches. Also, in some embodiments described above it is the case that each node sends a Report message each time slot. Instead, a round-robin approach may be utilized in which timeslots are assigned to each of the nodes in equal portions and in circular order such that for each time slot only the node(s) assigned to that time slot send their Report messages.

A single node, such as Node 1 in FIG. 1, may more generally be called an apparatus. Alternatively, the apparatus may encompass the single node in combination with other nodes, or the single node (and possibly other nodes) in combination with a PIU.

Figure 16:
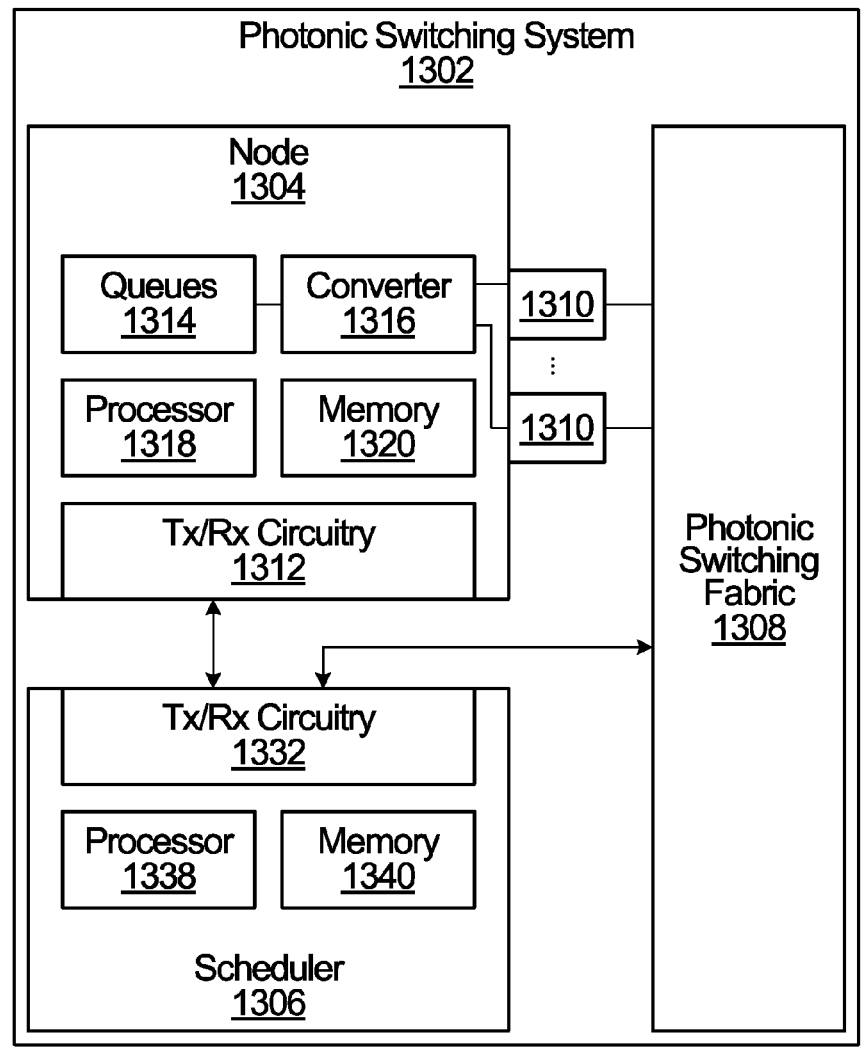
FIG. 16 is a block diagram of a photonic switching system in accordance with another embodiment.

The nodes and schedulers described above send and receive information and perform computations. The nodes and schedulers are physical hardware devices that have transmit and receive circuitry for communicating messages in the manner described above, as well as processing circuitry for performing the computations described above. As one example, FIG. 16 illustrates a photonic switching system 1302 having a node 1304, a scheduler 1306, and a photonic switching fabric 1308. Only one node (node 1304) is shown, but obviously there would be others so that data may be switched between the nodes through the switching fabric 1308. The node 1304 includes: a plurality of interfaces 1310 coupling the node 1304 to the photonic switching fabric 1308; transmission and receive circuitry 1312 (such as transmitter(s) and/or receiver(s)) for sending Report messages to and receiving Grant messages from the scheduler 1306; queues 1314 for storing data in the electronic domain that are destined for other nodes; a converter 1316 to convert data between the electronic domain and photonic signals; a processor 1318 for performing computations, such as computing the queue indexes–the processor may be a general purpose processor or dedicated circuitry, such as a field-programmable gate array (FPGA); and memory 1320 for storing parameters used by the processor 1318, and/or for storing instructions executed by the processor 1318 that cause the processor 1318 to perform computations such as computing the queue indexes. The queues 1314 may be part of the memory 1320, and the converter 1316 may be part of the interfaces 1310.

The scheduler 1306 includes: transmission and receive circuitry 1332 (such as transmitter(s) and/or receiver(s)) for receiving Report messages from and sending Grant messages to the node 1304, as well as for communicating with the photonic switching fabric 1308 in order to configure switches; a processor 1338 for performing computations and operations, such as sorting all received requests in order of priority–the processor may be a general purpose processor or dedicated circuitry, such as an FPGA; and memory 1340 for storing parameters used by the processor 1338, and/or for storing instructions executed by the processor 1338 that cause the processor 1338 to perform the required operations, such as sorting the priority of the requests.

Finally, it will be appreciated that the techniques described above may also be used in an electronic switching system. For example, if the photonic switches 102 in FIG. 1 were replaced with one or more electronic switches, and the conversion of data between the electronic and photonic domain was removed, the general principles regarding computing the queue index and sending a number of requests greater than a number of switch interfaces would remain the same.

Although the present invention has been described with reference to specific features and embodiments thereof, it is evident that various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, it will be appreciated that any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. An apparatus for use in a photonic switching system, the apparatus comprising:
    M photonic interfaces configured to transmit photonic signals from the apparatus to at least one photonic switching fabric;
    the apparatus configured to transmit a message comprising R requests, each one of the R requests comprising a request to transmit data from the apparatus to a node that is coupled to the apparatus through the at least one photonic switching fabric;
    wherein R is greater than M.

2. The apparatus of claim 1, further comprising Q queues for storing the data, and wherein each one of the R requests comprises a queue index corresponding to a respective queue, a value of the queue index being based on queue occupancy.

3. The apparatus of claim 2, wherein the queue occupancy is a number of data packets in the respective queue waiting to be transmitted.

4. The apparatus of claim 3, wherein the value of the queue index is based on both: (i) the number of data packets in the respective queue waiting to be transmitted, and (ii) a delay parameter.

5. The apparatus of claim 4, wherein the delay parameter is based on an arrival time of an earliest-arrived data packet in the respective queue.

6. The apparatus of claim 2 wherein the value of the queue index is based on both the queue occupancy and a delay parameter, and wherein the delay parameter is zero until a delay in the respective queue exceeds a delay threshold.

7. The apparatus of claim 2, wherein the value of the queue index is computed by:
    obtaining a first value based on the queue occupancy of the respective queue;
    obtaining a maximum delay value in the respective queue based on an arrival time of an earliest-arrived data packet in the respective queue;
    applying a function to the maximum delay value to obtain a second value; and
    obtaining the value of the queue index based on the first value and the second value.

8. The apparatus of claim 7, wherein the value of the queue index is computed as:

$$x_{ij} = \frac{p_{ij}}{P_{th}} + \frac{d_{ij}}{D_{th}} U(d_{ij} - D_{th}),$$

where $x_{ij}$ is the value of the queue index, $p_{ij}$ is a number of data packets in the respective queue, $d_{ij}$ is the maximum delay value, $P_{th}$ and $D_{th}$ are predetermined parameters, $$\frac{p_{ij}}{P_{th}}$$

is the first value, and $U(d_{ij}-D_{th})$ is the function used to obtain the second value, wherein the function is a step function configured to be $U(d_{ij}-D_{th})=0$ when the maximum delay value has not exceeded $D_{th}$.

9. The apparatus of claim 7, wherein the value of the queue index is computed as:

$$x_{ij} = \frac{q_{ij}}{Q_{th}} + \frac{d_{ij}}{D_{th}} U(d_{ij} - D_{th}),$$

where $x_{ij}$ is the value of the queue index, $q_{ij}$ is a number of bits or bytes in the respective queue, $d_{ij}$ is the maximum delay value, $Q_{th}$ and $D_{th}$ are predetermined parameters, $$\frac{q_{ij}}{Q_{th}}$$

is the first value, and $U(d_{ij}-D_{th})$ is the function used to obtain the second value, wherein the function is a step function configured to be $U(d_{ij}-D_{th})=0$ when the maximum delay value has not exceeded $D_{th}$.

10. The apparatus of claim 1, further comprising Q queues for storing the data, and wherein each one of the R requests comprises a queue index corresponding to a respective queue; wherein the apparatus is configured to use as the queue index a delay parameter based on an arrival time of an earliest-arrived data packet in the respective queue.

11. A method performed at an apparatus, the method comprising:
    transmitting a message comprising R requests, each one of the R requests comprising a request to transmit data from the apparatus to a node that is coupled to the apparatus through at least one photonic switching fabric;
    wherein the apparatus has M photonic interfaces configured to transmit photonic signals from the apparatus to the at least one photonic switching fabric; and
    wherein R is greater than M.

12. The method of claim 11, further comprising storing the data in Q queues, and wherein each one of the R requests included in the message comprises a queue index corresponding to a respective queue, a value of the queue index being based on queue occupancy.

13. The method of claim 12, wherein the queue occupancy is a number of data packets in the respective queue waiting to be transmitted.

14. The method of claim 13, wherein the value of the queue index is based on both: (i) the number of data packets in the respective queue waiting to be transmitted, and (ii) a delay parameter based on an arrival time of an earliest-arrived data packet in the respective queue.

15. The method of claim 12, further comprising computing the value of the queue index by:
    obtaining a first value based on the queue occupancy of the respective queue;
    obtaining a maximum delay value in the respective queue based on an arrival time of an earliest-arrived data packet in the respective queue;

applying a step function to the maximum delay value to obtain a second value, the step function configured to cause the second value to be zero when the maximum delay value has not exceeded a predetermined threshold; and obtaining the value of the queue index based on the first value and the second value.

16. An apparatus comprising:

K nodes;

a photonic interface unit (PIU) that optically couples the K nodes to a plurality of photonic switching fabrics;

each of the K nodes having M photonic interfaces coupled to the plurality of photonic switching fabrics, and each of the K nodes configured to transmit a message comprising R requests, each one of the R requests comprising a request to transmit data to another node different from the K nodes, wherein R is greater than M.

17. The apparatus of claim 16, wherein at least one of the plurality of switching fabrics has a fan-in switch that is configured to receive as its input an output of a particular photonic interface of each of the K nodes.

18. A scheduler for a photonic switching system, the scheduler configured to:

receive a message originating from a node in the photonic switching system, the node having M photonic interfaces, and the message comprising R requests, wherein each one of the R requests comprises a request to transmit data from the node to another node, and wherein R is greater than M;

prioritize each of the R requests in relation to other requests from other nodes;

determine whether at least one of the R requests is to be granted;

transmit a grant message to the node, the grant message including an indication of which of the R requests have been granted.

19. The scheduler of claim 18, wherein if a particular request is unable to be granted due to a photonic interface not being available, then the scheduler is configured to determine whether another request of lower priority is able to be granted.

20. The scheduler of claim 18, wherein the photonic switching system comprises M switching fabrics, each one of the M switching fabrics having a corresponding interface on each of N nodes in the photonic switching system; the number of requests R is greater than the number of the switching fabrics M.

21. A method performed by a scheduler in a photonic switching system, the method comprising:

receiving a message originating from a node in the photonic switching system, the node having M photonic interfaces, and the message comprising R requests, wherein each one of the R requests comprises a request to transmit data from the node to another node, and wherein R is greater than M;

prioritizing each of the R requests in relation to other requests from other nodes;

determining whether at least one of the R requests is to be granted;

transmitting a grant message to the node, the grant message including an indication of which of the R requests have been granted.

22. The method of claim 21, further comprising:

if a particular request is unable to be granted due to a photonic interface not being available, then determining whether another request of lower priority is able to be granted.

23. The method of claim 21, wherein the photonic switching system comprises M switching fabrics, each one of the M switching fabrics having a corresponding interface on each of N nodes in the photonic switching system; the number of requests R is greater than the number of the switching fabrics M.

* * * * *